United States Patent
Ukai et al.

(10) Patent No.: US 10,722,841 B2
(45) Date of Patent: Jul. 28, 2020

(54) HYDROGEN SUPPLY SYSTEM

(71) Applicant: Panasonic Intellectual Property Management Co., Ltd., Osaka (JP)

(72) Inventors: Kunihiro Ukai, Nara (JP); Osamu Sakai, Osaka (JP); Atsuo Okaichi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 89 days.

(21) Appl. No.: 16/009,517

(22) Filed: Jun. 15, 2018

(65) Prior Publication Data

US 2019/0009209 A1 Jan. 10, 2019

(30) Foreign Application Priority Data

Jul. 5, 2017 (JP) ................................. 2017-131698

(51) Int. Cl.
*B01D 53/32* (2006.01)
*C01B 3/50* (2006.01)
(Continued)

(52) U.S. Cl.
CPC ............ *B01D 53/326* (2013.01); *C01B 3/503* (2013.01); *C25B 1/10* (2013.01); *C25B 9/10* (2013.01);
(Continued)

(58) Field of Classification Search
CPC .............................. B01D 53/326; C25B 15/02
See application file for complete search history.

(56) References Cited

U.S. PATENT DOCUMENTS

2004/0253494 A1 12/2004 Maruyama et al.
2007/0246373 A1 10/2007 Ludlow et al.
(Continued)

FOREIGN PATENT DOCUMENTS

CA 2232737 A1 9/1998
JP 2002-069681 3/2002
(Continued)

OTHER PUBLICATIONS

Extended European Search Report, dated Nov. 7, 2018, from the European Patent Office (EPO) for the related European Patent Application No. 18181100.1.

*Primary Examiner* — Nicholas A Smith
(74) *Attorney, Agent, or Firm* — Greenblum & Bernstein, P.L.C.

(57) ABSTRACT

A hydrogen supply system includes: a controller; and an electrochemical hydrogen pump including: an electrolyte membrane; a pair of electrodes provided on two surfaces of the electrolyte membrane; and a current adjuster adjusting a current flowing between the electrodes, the electrochemical hydrogen pump performs a hydrogen supply operation supplying pressure-boosted hydrogen to a hydrogen demander by allowing a current to flow between the electrodes by the current adjuster; and when a cumulative hydrogen supply amount which is supplied to the hydrogen demander from start to completion of the hydrogen supply operation to the hydrogen demander from the electrochemical hydrogen pump is smaller than a cumulative hydrogen supply amount in another hydrogen supply operation, the controller controls the current adjuster so that the current flowing between the electrodes is decreased to be smaller than that in the another hydrogen supply operation.

18 Claims, 9 Drawing Sheets

(51) Int. Cl.
  *C25B 15/02* (2006.01)
  *C25B 1/10* (2006.01)
  *C25B 9/10* (2006.01)
  *H01M 8/0656* (2016.01)
  *H01M 8/1018* (2016.01)
(52) U.S. Cl.
  CPC ...... *C25B 15/02* (2013.01); *C01B 2203/0405* (2013.01); *H01M 8/0656* (2013.01); *H01M 2008/1095* (2013.01)

(56) References Cited

U.S. PATENT DOCUMENTS

| | | | |
|---|---|---|---|
| 2014/0352840 A1* | 12/2014 | Blanchet | F17C 5/06 141/4 |
| 2015/0060294 A1* | 3/2015 | Prescott | C25B 1/12 205/338 |
| 2016/0002795 A1 | 1/2016 | Beverage et al. | |
| 2016/0168730 A1 | 6/2016 | Watanabe | |

FOREIGN PATENT DOCUMENTS

| | | |
|---|---|---|
| JP | 2006-070322 | 3/2006 |
| WO | 2015/020065 | 2/2015 |

* cited by examiner

HYDROGEN SUPPLY SYSTEM

BACKGROUND

1. Technical Field

The present disclosure relates to a hydrogen supply system.

2. Description of the Related Art

In recent years, because of environmental issues, such as the global warming, and energy issues, such as depletion of petroleum resources, as clean alternative energy resources instead of fossil fuels, attention has been paid on hydrogen. When hydrogen is combusted, from a theoretical point of view, water is only emitted, carbon dioxide which causes the global warming is not emitted, and nitrogen oxides are also not substantially emitted; hence, hydrogen is expected as clean energy. In addition, as a device using hydrogen as a fuel at a high efficiency, for example, fuel batteries are mentioned, and for automobile power sources and household power generation, the fuel batteries have been developed and spread.

In a coming hydrogen society, technical development has been desired so that, besides hydrogen gas manufacturing, a hydrogen gas can be stored at a high density, and a small volume thereof can be transported or used at a low cost. In particular, in order to facilitate the spread of a fuel battery used as a distributed energy source, a fuel supply infrastructure is required to be well organized. In addition, in order to stably supply hydrogen to the fuel supply infrastructure, various proposals have been made for purification to obtain a high purity hydrogen gas and for pressure-boosting thereof.

For example, in a high-pressure hydrogen manufacturing device, when an electrolyte membrane and an anode electricity feeder are deformed by a pressing force at a high pressure side, the contact resistance between a cathode electricity feeder and the electrolyte membrane/the anode electricity feeder may be increased in some cases. Accordingly, in consideration of the deformation of the electrolyte membrane and the anode electricity feeder, a pressing structure including a plate spring or a coil has been proposed in order to closely adhere the cathode electricity feeder to the electrolyte membrane (for example, see Japanese Unexamined Patent Application Publication No. 2006-70322).

In addition, in order to prevent the damage on a membrane electrode assembly and to improve the adhesion thereto, an electrochemical-cell electricity feeder including a metal-fiber laminate has been proposed which is formed by filling an electrically conductive material powder, such as a titanium powder or a carbon-based material powder, between titanium fibers and which has smoothed surfaces (for example, see Japanese Unexamined Patent Application Publication No. 2002-69681).

In addition, in order to purify hydrogen gas from a reformed gas at a low cost and to boost the pressure thereof while the durability against a high-pressure environment is secured, there has been proposed a hydrogen purification and pressure-boosting device which has a cell structure including layers laminated to each other and a fastening structure applying a fastening force to this cell structure in the lamination direction thereof (for example, see International Publication No. 2015/020065).

SUMMARY

Incidentally, heretofore, since hydrogen energy of a hydrogen supply system has been desired to be used at a high efficiency, an improvement in efficiency of a hydrogen supply operation of an electrochemical hydrogen pump of a hydrogen supply system is important.

In the related examples, although the improvement in efficiency of the hydrogen supply operation has been studied in view of electrical contact between a catalyst layer and an electricity feeder of the electrochemical hydrogen pump, the improvement in efficiency of the hydrogen supply operation in view of current flowing between electrodes of the electrochemical hydrogen pump has not been studied.

One non-limiting and exemplary embodiment provides a hydrogen supply system which improves the efficiency of a hydrogen supply operation of an electrochemical hydrogen pump as compared to that in the past by suppressing a hydrogen supply in an amount more than necessary.

In one general aspect, the techniques disclosed here feature a hydrogen supply system which comprises: a controller; and an electrochemical hydrogen pump including: an electrolyte membrane; a pair of electrodes provided on two surfaces of the electrolyte membrane; and a current adjuster adjusting a current flowing between the electrodes, the electrochemical hydrogen pump performs a hydrogen supply operation supplying pressure-boosted hydrogen to a hydrogen demander by allowing a current to flow between the electrodes by the current adjuster; and when a cumulative hydrogen supply amount which is supplied to the hydrogen demander from start to completion of the hydrogen supply operation to the hydrogen demander from the electrochemical hydrogen pump is smaller than a cumulative hydrogen supply amount in another hydrogen supply operation, the controller controls the current adjuster so that the current flowing between the electrodes is decreased to be smaller than that in the another hydrogen supply operation.

The hydrogen supply system according to one aspect of the present disclosure has an advantage in that the efficiency of the hydrogen supply operation of the electrochemical hydrogen pump is improved as compared to that in the past by suppressing a hydrogen supply in an amount more than necessary.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
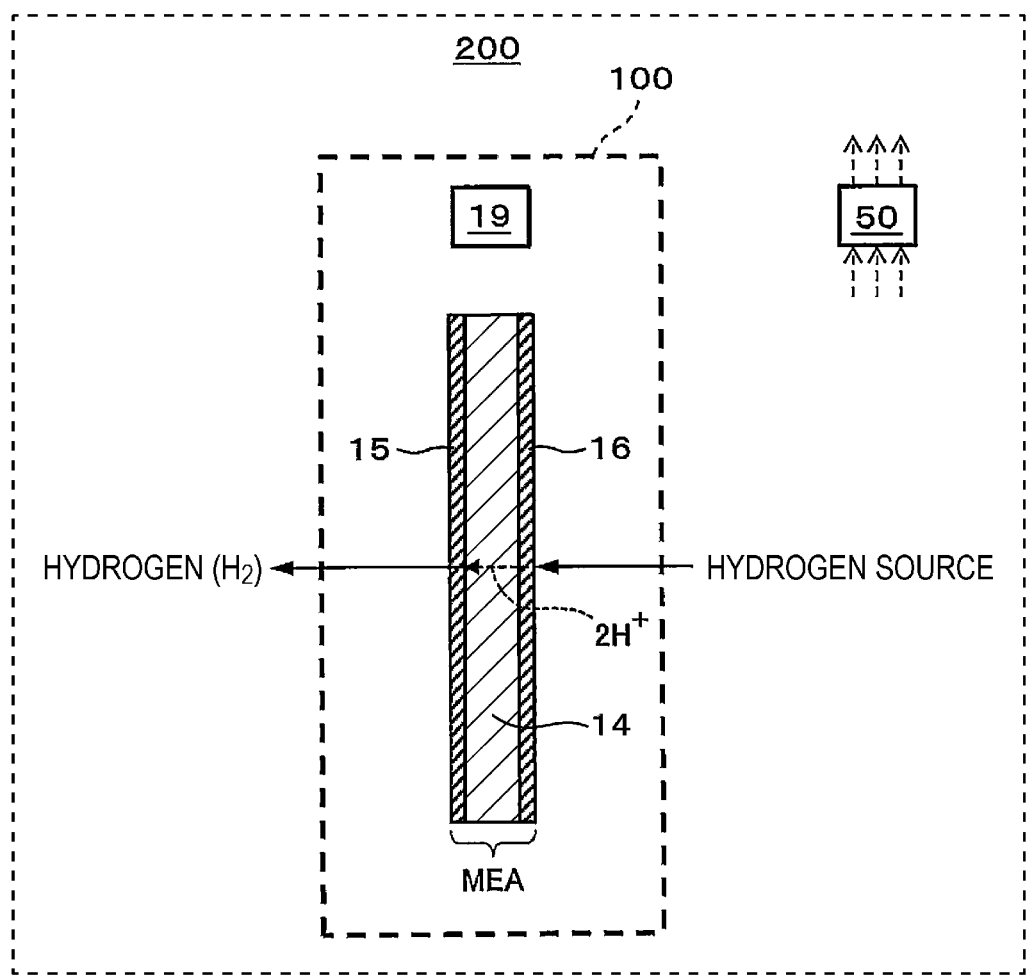
FIG. 1 is a schematic view showing one example of a hydrogen supply system of a first embodiment.

As described above, according to the related examples, when the degradation in electrical contact between the catalyst layer and the electricity feeder is suppressed, the increase in voltage required for the hydrogen supply operation of the electrochemical hydrogen pump can be suppressed. Hence, the increase in consumption of electric energy in the hydrogen supply operation of the electrochemical hydrogen pump can be suppressed.

However, when the amount of hydrogen in the hydrogen supply operation of the electrochemical hydrogen pump is increased, a current to be supplied to the electrochemical hydrogen pump is increased in proportional to the amount of hydrogen. As a result, the amount of electric energy to be consumed in the hydrogen supply operation of the electrochemical hydrogen pump in increased.

Hence, the present inventors have conceived that a hydrogen supply in an amount more than necessary is suppressed by controlling a current flowing between electrodes of an electrochemical hydrogen pump.

That is, a hydrogen supply system of a first aspect of the present disclosure comprises a controller; and an electrochemical hydrogen pump including: an electrolyte membrane; a pair of electrodes provided on two surfaces of the electrolyte membrane; and a current adjuster adjusting a current flowing between the electrodes, the electrochemical hydrogen pump performs a hydrogen supply operation supplying pressure-boosted hydrogen to a hydrogen demander by allowing a current to flow between the electrodes by the current adjuster; and when a cumulative hydrogen supply amount which is supplied to the hydrogen demander from start to completion of the hydrogen supply operation to the hydrogen demander from the electrochemical hydrogen pump is smaller than a cumulative hydrogen supply amount in another hydrogen supply operation, the controller controls the current adjuster so that the current flowing between the electrodes is decreased to be smaller than that in the another hydrogen supply operation.

According to the structure described above, in the hydrogen supply system of this aspect, since a hydrogen supply in an amount more than necessary is suppressed, the efficiency of the hydrogen supply operation of the electrochemical hydrogen pump is improved as compared to that in the past. That is, in accordance with the cumulative hydrogen supply amount in the hydrogen supply operation of the electrochemical hydrogen pump, the current flowing between the electrodes is appropriately controlled, and as a result, the increase in consumption of electric energy in the hydrogen supply operation of the electrochemical hydrogen pump can be suppressed.

In a hydrogen supply system of a second aspect of the present disclosure according to the hydrogen supply system of the first aspect, the controller may predict the cumulative hydrogen supply amount in the hydrogen supply operation based on a past record of the cumulative hydrogen supply amount and, when the predicted cumulative hydrogen supply amount is smaller than the cumulative hydrogen supply amount in the another hydrogen supply operation, the controller may control the current adjuster so that the current flowing between the electrodes is decreased smaller than that in the another hydrogen supply operation.

According to the structure described above, in the hydrogen supply system of this aspect, since the cumulative hydrogen supply amount in a future hydrogen supply operation is predicted based on the past record of the cumulative hydrogen supply amount in the hydrogen supply operation of the electrochemical hydrogen pump, the current flowing between the electrodes can be appropriately controlled. Accordingly, compared to the case in which the cumulative hydrogen supply amount is not predicted unlike the above case, in the hydrogen supply operation of the electrochemical hydrogen pump, an appropriate amount of hydrogen can be supplied to the hydrogen demander from the electrochemical hydrogen pump.

In a hydrogen supply system of a third aspect of the present disclosure according to the hydrogen supply system of the first or the second aspect, the controller may control the current adjuster so that the cumulative hydrogen supply amount required in an operable time of the hydrogen supply operation of the electrochemical hydrogen pump is supplied to the hydrogen demander and so that a time in which the current flowing between the electrodes is controlled smaller than that in the another hydrogen supply operation is maximized in the operable time.

According to the structure as described above, in the hydrogen supply system of this aspect, while the operable time of the hydrogen supply operation of the electrochemical hydrogen pump is maximally used, hydrogen can be supplied to the hydrogen demander from the electrochemical hydrogen pump. Hence, compared to the case in which the operable time of the hydrogen supply operation is not maximally used unlike the above case, since the current flowing between the electrodes is decreased, the increase in consumption of electric energy in the hydrogen supply operation of the electrochemical hydrogen pump can be suppressed.

A hydrogen supply system of a fourth aspect of the present disclosure according to the hydrogen supply system of one of the first to the third aspects may further comprise: a hydrogen reservoir storing hydrogen to be supplied from the electrochemical hydrogen pump; and a pressure detector detecting the pressure in the hydrogen reservoir, and the controller may estimate a hydrogen storage amount in the hydrogen reservoir from the pressure detected by the pressure detector.

According to the structure as described above, since the pressure in the hydrogen reservoir is detected by the pressure detector, direct information corresponding to the cumulative hydrogen supply amount in the hydrogen supply operation of the electrochemical hydrogen pump can be obtained. Hence, compared to the case in which the pressure of the hydrogen reservoir is not detected, the current adjuster of the electrochemical hydrogen pump can be controlled at a high accuracy. Accordingly, in the hydrogen supply operation of the electrochemical hydrogen pump, an appropriate amount of hydrogen can be supplied to the hydrogen reservoir from the electrochemical hydrogen pump.

A hydrogen supply system of a fifth aspect of the present disclosure according to the hydrogen supply system of one of the first to the fourth aspects may further comprise: a temperature detector detecting the temperature of the electrochemical hydrogen pump, and the controller may control the current adjuster so that the temperature detected by the temperature detector does not exceed an upper limit temperature by adjusting the current flowing between the electrodes.

According to the structure as described above, the operation temperature of the electrochemical hydrogen pump can be controlled at an appropriate temperature which is equivalent to or less than the upper limit temperature.

For example, when the electrolyte membrane of the electrochemical hydrogen pump is a high molecular weight electrolyte membrane, as the temperature of the electrochemical hydrogen pump is increased, the high molecular weight electrolyte membrane may be dried in some cases. Accordingly, by the increase in electric resistance of the high molecular weight electrolyte membrane, it may be difficult in some cases to perform a stable and a highly efficient operation of the hydrogen supply system.

Hence, in the hydrogen supply system of this aspect, since the operation temperature of the electrochemical hydrogen pump is set to the upper limit temperature or less by adjusting the current flowing between the electrodes, the probability as described above can be reduced. That is, when the current flowing between the electrodes of the electrochemical hydrogen pump is decreased, the current density of the electrolyte membrane is decreased, and hence, heat generation of the high molecular weight electrolyte membrane can be suppressed. Accordingly, since the increase in electric resistance caused by the drying of the high molecular weight electrolyte membrane can be suppressed, the hydrogen supply system is likely to be stably operated at a high efficiency.

A hydrogen supply system of a sixth aspect of the present disclosure according to the hydrogen supply system of one of the first to the fourth aspects may further comprise: a temperature detector detecting the temperature of the electrochemical hydrogen pump; and a cooling device for the electrochemical hydrogen pump, and the controller may operate the cooling device so that the temperature detected by the temperature detector does not exceed an upper limit temperature.

According to the structure as described above, the operation temperature of the electrochemical hydrogen pump can be controlled at an appropriate temperature which is equivalent to or less than the upper limit temperature.

When the electrolyte membrane of the electrochemical hydrogen pump is, for example, a high molecular weight electrolyte membrane, as the temperature of the electrochemical hydrogen pump is increased, the high molecular weight electrolyte membrane may be dried in some cases. As a result, by the increase in electric resistance of the high molecular weight electrolyte membrane, it may be difficult in some cases to perform a stable and a highly efficient operation of the hydrogen supply system.

Hence, in the hydrogen supply system of this aspect, by the operation of the cooling device for the electrochemical hydrogen pump, the operation temperature of the electrochemical hydrogen pump is set to the upper limit temperature or less, so that the probability as described above can be reduced. Accordingly, since the increase in electric resistance caused by the drying of the high molecular weight electrolyte membrane is suppressed, the hydrogen supply system is likely to be stably operated at a high efficiency.

A hydrogen supply system of a seventh aspect of the present disclosure according to the hydrogen supply system of one of the first to the fourth aspects may further comprise: a temperature detector detecting the temperature of the electrochemical hydrogen pump; and a cooling device for the electrochemical hydrogen pump, and the controller may control an operation of the cooling device and the operation of the electrochemical hydrogen pump so that the temperature detected by the temperature detector does not exceed an upper limit temperature and so as to minimize the total of electric energy required for the operation of the cooling device and electric energy required for the operation of the electrochemical hydrogen pump.

According to the structure as described above, in the hydrogen supply system of this aspect, while the operation temperature of the electrochemical hydrogen pump is controlled at an appropriate temperature which is equivalent to or less than the upper limit temperature, the operation of the cooling device and the operation of the electrochemical hydrogen pump are controlled, and hence, the operation efficiency can be optimized so that the total electric energy required for the above two operations is minimized.

In a hydrogen supply system of an eighth aspect of the present disclosure according to the hydrogen supply system of one of the first to the seventh aspects may further comprise, a display device displaying a supply rate of hydrogen to be supplied from the hydrogen supply system, the cumulative hydrogen supply amount, and a time required for the hydrogen supply operation.

According to the structure as described above, an operator can easily visually recognize on a display screen of the display device, various information, such as the hydrogen supply rate, the cumulative hydrogen supply amount, and the time required fro the hydrogen supply operation.

A hydrogen supply system of a ninth aspect of the present disclosure according to the hydrogen supply system of one of the first to the eighth aspects may further comprise an acquisition device acquiring an instruction of canceling the control (hereinafter, referred to as "highly efficient operation of the hydrogen supply system") by the controller in which the current flowing between the electrodes is decreased smaller than that in the another hydrogen supply operation by controlling the current adjuster in the hydrogen supply operation.

According to the structure as described above, since the hydrogen supply system of this aspect comprises the above acquisition device, the highly efficient operation of the hydrogen supply system can be cancelled.

Hereinafter, with reference to the attached drawings, embodiments of the present disclosure will be described. The following embodiments are each described to shown one example of the above aspect.

Hence, the following numerical values, shapes, materials, constituent elements, arrangement and connection between the constituent elements, and the like are each shown by way of example, and as long as the above items are not described in the claims, the aspects described above are not limited thereto. In addition, among the following constituent elements, a constituent element not described in the independent claim indicating the topmost concept of this aspect will be described as an arbitrary constituent element. In addition, in the drawings, description of elements designated by the same reference numeral may be omitted in some cases. In order to facilitate the understanding of the drawing, the constituent elements are each schematically shown, and for example, the shapes and/or the dimensional ratio thereof may be not accurate in some cases. In addition, as for the operation, if needed, the order of steps may be appropriately changed, and another known step may also be added.

First Embodiment

[Device Structure]

FIG. 1 is a schematic view showing one example of a hydrogen supply system of a first embodiment.

In the example shown in FIG. 1, a hydrogen supply system 200 includes an electrochemical hydrogen pump 100 and a controller 50.

The electrochemical hydrogen pump 100 includes an electrolyte membrane 14, a pair of electrodes 15 and 16, and a current adjuster 19.

As the electrolyte membrane 14, any type of electrolyte membrane may be used as long as having a protonic conductivity. As the electrolyte membrane 14, for example, a high molecular weight electrolyte membrane or a solid oxide membrane may be mentioned. In addition, as the high molecular weight electrolyte membrane, for example, there may be mentioned a fluorine-containing high molecular weight electrolyte membrane. In particular, for example, Nafion (registered trade name, manufactured by Du Pont) or Aciplex (trade name, manufactured by Asahi Kasei Corporation) may be mentioned.

The pair of electrodes 15 and 16 is provided on two surfaces of the electrolyte membrane 14. That is, of the pair of electrodes 15 and 16, one electrode 15 is provided on one primary surface of the electrolyte membrane 14, and the other electrode 16 is provided on the other primary surface of the electrolyte membrane 14. In addition, a laminate structure of the electrode 15, the electrolyte membrane 14, and the electrode 16 is called a membrane electrode assembly (hereinafter, referred to as "MEA" in some cases).

The electrode 15 includes a catalyst layer provided on the one primary surface of the electrolyte membrane 14. The catalyst layer of the electrode 15 may contain as a catalyst metal, for example, platinum (Pt) but is not limited thereto.

The electrode 16 includes a catalyst layer provided on the other primary surface of the electrolyte membrane 14. The catalyst layer of the electrode 16 may contain as a catalyst metal, for example, platinum (Pt) but is not limited thereto.

In addition, as a method for preparing a catalyst of the catalyst layer of each of the electrodes 15 and 16, various methods may be mentioned but are not particularly limited. For example, as a support of the catalyst, for example, an electrically conductive porous material powder or a carbon-based powder may be mentioned. As the carbon-based powder, for example, there may be mentioned graphite, carbon black, or a powder, such as active carbon, having an electrical conductivity may be mentioned. A method for supporting platinum or another catalyst metal on a support, such as carbon, is not particularly limited. For example, a method, such as powder mixing or liquid phase mixing, may be used. In the latter liquid phase mixing, for example, there may be mentioned a method in which a support, such as carbon, is dispersed in a catalyst component colloidal liquid so that the catalyst component is adsorbed on the support. In addition, if needed, an active-oxygen removing material is used as a support, and platinum or another catalyst metal may be supported thereon by a method similar to that described above. A supporting state of a catalyst metal, such as platinum, on the support is not particularly limited. For example, after a catalyst metal is pulverized into fine particles, the particles thus obtained may be supported on the support in a highly-dispersed state.

In addition, although not shown in FIG. 1, in the thin-film electrolyte membrane 14, along end portions thereof on which the catalyst layer of the electrode 15 and the catalyst layer of the electrode 16 are not formed, a frame body securing the shape and the gas sealing of the electrolyte membrane 14 may be provided. This frame body may be formed from a material having a higher rigidity than that of the electrolyte membrane 14. In addition, the frame body may also have a gas sealing structure formed by using, for example, an O-ring formed from a fluorine-containing rubber.

The current adjuster 19 is a device adjusting a current flowing between the electrodes 15 and 16. The current adjuster 19 may have any structure as long as capable of adjusting the current flowing between the electrodes 15 and 16.

The current adjuster 19 may be, for example, a voltage applier adjusting the voltage to be applied to the electrodes 15 and 16. As the voltage applier, for example, there may be mentioned a DC/DC converter or an AC/DC converter. The DC/DC converter is used when the voltage applier is connected to a direct power source, such as a battery, and the AC/DC converter is used when the voltage applier is connected to an alternating current power source, such as a commercial power source. When the current adjuster 19 is a voltage applier, a high potential side terminal of the voltage applier is connected to the electrode 16, and a low potential side terminal of the voltage applier is connected to the electrode 15.

The electrochemical hydrogen pump 100 is a device performing a hydrogen supply operation which supplies to a hydrogen demander, pressure-boosted hydrogen ($H_2$) by allowing a current to flow between the electrodes 15 and 16 by the current adjuster 19.

In this case, as the hydrogen demander, for example, a household fuel cell or an automobile fuel cell may be mentioned. In addition, when the hydrogen supply system 200 includes a hydrogen reservoir (not shown in FIG. 1) in which hydrogen supplied from the electrochemical hydrogen pump 100 is stored, hydrogen is first supplied from the electrochemical hydrogen pump 100 to the hydrogen reservoir and is then supplied therefrom to the hydrogen demander.

In addition, as a hydrogen source of the electrochemical hydrogen pump 100, any material capable of generating a proton ($H^+$) on the electrode 16 may be used. As the hydrogen source as described above, for example, hydrogen ($H_2$), an organic hydride, or water may be mentioned. For example, when hydrogen is the hydrogen source, this hydrogen may be supplied from a hydrogen tank storing hydrogen or a water electrolysis device generating hydrogen by electrolysis of water. When the organic hydride is the hydrogen source, hydrogen is withdrawn from the organic hydride by the electrode 16 of the electrochemical hydrogen pump 100. When water is the hydrogen source, hydrogen is generated by electrolysis of water on the electrode 16 of the electrochemical hydrogen pump 100. That is, by the electrode 16 of the electrochemical hydrogen pump 100, protons ($H^+$) are generated from the hydrogen source as described above. Subsequently, protons ($H^+$) permeate the electrolyte membrane 14, and a hydrogen gas ($H_2$) is generated on the electrode 15 of the electrochemical hydrogen pump 100. In the case described above, since the amount of hydrogen generated on the electrode 15 is increased, the pressure of the hydrogen gas is increased. The details will be described later.

When a cumulative hydrogen supply amount to be supplied to the hydrogen demander from the start to the completion of the hydrogen supply operation to the hydrogen demander from the electrochemical hydrogen pump 100 is smaller than a cumulative hydrogen supply amount in another hydrogen supply operation, the controller 50 controls the current adjuster 19 so that the current flowing between the electrodes 15 and 16 is decreased smaller than that in the another hydrogen supply operation.

In this case, when the current adjuster 19 is a voltage applier, the current flowing between the electrodes 15 and 16 may be adjusted by changing the application voltage of the voltage applier to be applied between the electrodes 15 and 16. In particular, when the current flowing between the electrodes 15 and 16 is decreased smaller than that in the another hydrogen supply operation, the application voltage of the voltage applier may be decreased.

In addition, the adjustment of decreasing the current flowing between the electrodes 15 and 16 may also be realized by fixing the application voltage of the voltage applier to a predetermined value. For example, in the case in which the hydrogen storage amount in the hydrogen reservoir is large, and the hydrogen supply operation is started when the pressure therein is high, the pressure of a hydrogen gas in a container receiving the electrode 15 is increased. When the pressure of the container receiving the electrode 15 is increased, in accordance with Nernst equation, the resistance between the electrodes 15 and 16 is increased. Hence, in the case described above, when the application voltage of the voltage applier is fixed to a predetermined value, the current flowing between the electrodes 15 and 16 is automatically decreased because of the relationship among the voltage, the current, and the resistance.

In addition, in the above case in which the hydrogen storage amount in the hydrogen reservoir is large, and the hydrogen supply operation is started when the pressure in the hydrogen reservoir is high, the cumulative hydrogen supply amount in the hydrogen supply operation is generally small.

Accordingly, as described above, the control in which the application voltage of the voltage applier is fixed to a predetermined value is also included in the control of "the current flowing between the electrodes is decreased smaller than that in another hydrogen supply operation by controlling the current adjuster" of the present disclosure.

The controller 50 may have any structure as long as having a control function. The controller 50 includes, for example, a computing circuit (not shown) and a storage circuit (not shown) storing a control program. As the computing circuit, for example, an MPU or a CPU may be mentioned. As the storage circuit, for example, a memory may be mentioned. The controller 50 may be either a single controller performing a central control or a plurality of controllers performing a dispersion control in cooperation with each other.

Although not being shown in FIG. 1, at least one member necessary for the hydrogen supply operation of the electrochemical hydrogen pump 100 may be appropriately provided.

For example, the electrochemical hydrogen pump 100 includes an electrically conductive separator supplying a hydrogen source to the electrode 16. This separator has at least one fluid flow path and is a plate-shaped member supplying a hydrogen source to the electrode 16. The separator may have any structure as long as capable of supplying the hydrogen source to the electrode 16.

In the electrochemical hydrogen pump 100, in general, a sealing material, such as an O-ring, is provided to prevent hydrogen at a high pressure from leaking outside and is integrally assembled with the MEA in advance. In addition, a pair of the above separators is provided on the two outside primary surfaces of the MEA so as to mechanically fix the MEA and also to electrically connect adjacent MEAs to each other in series. In a portion of the separator in contact with the electrode 16 of the MEA, the above fluid flow path is formed to supply the hydrogen source to the MEA and also to carry away an excessive hydrogen source from the MEA. This fluid flow path may be formed in the separator, for example, to have a straight shape or a serpentine shape.

In addition, a laminate structure may be formed in such a way that after the MEAs and the separators are alternately laminated to each other to form a dozen to several hundreds of cells, this laminate is sandwiched by end plates with collector plates and insulating plates interposed therebetween, and the two end plates are fastened by fastening rods. In this case, in order to supply an appropriate amount of the hydrogen source to the respective fluid flow paths of the separators in contact with the electrodes 16, the structure must be formed so that the fluid flow path of each separator is branched from a conduit line through which the hydrogen source flows. The conduit line as described above is called a manifold, and this manifold is formed from a series of through-holes which are formed at appropriate positions of the separators.

In addition, the electrodes 15 and 16 each may have a diffusion layer not shown in the figure.

For example, the diffusion layer of the electrode 16 may be a laminate of metal plates each having a plurality of through-holes which diffuse hydrogen. In this case, the metal plate may be formed of a metal, such as stainless steel, titanium, a titanium alloy, or an aluminum alloy. The thickness of the diffusion layer may be, for example, approximately several hundreds of micrometers (such as approximately 400 μm).

In addition, the diffusion layer of the electrode 15 is formed, for example, of high-modulus graphitized carbon fibers or a porous body formed by performing platinum plating on the surface of a titanium powder sintered body and may be used in the form of paper. In addition, in the case in which the former graphitized carbon fibers are used, by performing a heat treatment at a temperature of, for example, 2,000° C. or more on carbon fibers, graphite crystals are grown and changed into graphite fibers.

In addition, the above various members not shown in the figures are described by way of example and are not limited to this example.

[Operation]

Hereinafter, an operation of the hydrogen supply system 200 of the first embodiment will be described with reference to FIG. 1. In addition, the case in which a hydrogen gas ($H_2$) is supplied as the hydrogen source to the electrode 16 will be described. In addition, the following operation may be performed in such a way that the computing circuit of the controller 50 reads the control program from the storage circuit. However, it is not always essential that the following operation is performed by the controller 50. An operator may partially or fully perform the operation. For example, the hydrogen supply system 200 may have a display device, such as a liquid crystal display, having a display mechanism and a touch operation function. In the case described above, an operation state of the hydrogen supply system 200 is displayed on the display device, and in addition, a control instruction by the operator is input in the computing circuit of the controller 50 at an appropriate time through the display device.

First, by the voltage applier which is one example of the current adjuster 19, a desired voltage is applied between the electrodes 15 and 16.

Next, when a hydrogen gas is supplied to the electrode 16 of the electrochemical hydrogen pump 100, hydrogen atoms of the hydrogen gas release electrons on the catalyst layer of the electrode 16, and protons (H$^+$) are generated (Formula (1)). The electrons thus released move to the electrode 15 through the voltage applier.

In addition, the protons move to the catalyst layer of the electrode 15 through the electrolyte membrane 14. On the catalyst layer of the electrode 15, a reduction reaction is performed between the protons passing through the electrolyte membrane 14 and electrons, and as a result, a hydrogen gas (H$_2$) is generated (Formula (2)).

In addition, when a pressure drop of a flow path member introducing a hydrogen gas from the electrode 15 of the electrochemical hydrogen pump 100 to the outside is increased (for example, when an opening/closing valve is provided for the flow path member, the opening/closing valve is closed), a hydrogen gas pressure P2 at an electrode 15 side is increased. In particular, the relationship among a hydrogen gas pressure P1 at an electrode 16 side, the hydrogen gas pressure P2 at the electrode 15 side, and a voltage E of the voltage applier is represented by the following formula (3).

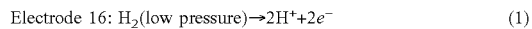
Electrode 16: H$_2$(low pressure)→2H$^+$+2e$^-$      (1)

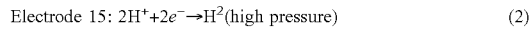
Electrode 15: 2H$^+$+2e$^-$→H$^2$(high pressure)      (2)

$$E=(RT/2F)\ln(P2/P1)+ir \qquad (3)$$

In Formula (3), R represents a gas constant (8.3145 J/K·mol), T represents a temperature (K) of the MEA, F represents a Faraday constant (96,485 C/mol), P2 represents a hydrogen gas pressure at the electrode 15 side, P1 represents a hydrogen gas pressure at the electrode 16 side, i represents a current density (A/cm$^2$), and r represents a cell resistance (Ω·cm$^2$).

From Formula (3), it is easily understood that when the voltage E of the voltage applier is increased, the hydrogen gas pressure P2 at the electrode 15 side is increased.

Accordingly, in the electrochemical hydrogen pump 100 of this embodiment, when the pressure drop of the above flow path member is increased, and at the same time, when the voltage E of the voltage applier is increased, the hydrogen gas pressure P2 at the electrode 15 side is increased. A hydrogen gas at the electrode 15 side having an increased hydrogen gas pressure P2 is discharged to the outside (for example, such as a hydrogen reservoir not shown in the figure) through the flow path member or the like.

Incidentally, the increase in voltage E of the voltage applier indicates that when the cell resistance r (Ω·cm$^2$) is maintained constant, the current flowing between the electrodes 15 and 16 is increased. In addition, as a result, the amount of hydrogen flowing from the electrode 16 to the electrode 15 of the electrochemical hydrogen pump 100 is increased. That is, when a sufficient amount of hydrogen is supplied from the electrode 15 of the electrochemical hydrogen pump 100 to the outside in a short time, the increase in current flowing between the electrodes 15 and 16 is effective in view of the reduction in time for the hydrogen supply operation of the electrochemical hydrogen pump 100. However, the increase in current described above indicates an increase in electric energy which is obtained as the product of the voltage and the current. That is, the increase in voltage E of the voltage applier causes a decrease in efficiency of the hydrogen supply operation of the electrochemical hydrogen pump 100, and as a result, the operation efficiency of the hydrogen supply system 200 is decreased. Hence, the reduction in time for the hydrogen supply operation of the electrochemical hydrogen pump 100 and the operation efficiency of the hydrogen supply system 200 have a trade-off relationship.

Next, the case in which the hydrogen supply system 200 includes a hydrogen reservoir storing hydrogen to be supplied from the electrochemical hydrogen pump 100 is considered. In this case, if the storage amount of hydrogen in the hydrogen reservoir is deficient (for example, the inside pressure of the hydrogen reservoir is a normal pressure), it is desired that by sufficiently increasing the current flowing between the electrodes 15 and 16, the operation ability of the electrochemical hydrogen pump 100 is sufficiently obtained, and a large amount of hydrogen is charged in the hydrogen reservoir in a short time. However, when the storage amount of hydrogen in the hydrogen reservoir is sufficient (for example, the inside pressure of the hydrogen reservoir is a predetermined pressure), the amount of hydrogen to be charged in the hydrogen reservoir may be small.

Accordingly, in the hydrogen supply system 200 of this embodiment, as described above, when the cumulative hydrogen supply amount to be supplied to the hydrogen demander from the start to the completion of the hydrogen supply operation to the hydrogen demander from the electrochemical hydrogen pump 100 is smaller than the cumulative hydrogen supply amount in the another hydrogen supply operation, the controller 50 controls the current adjuster 19 so that the current flowing between the electrodes 15 and 16 is decreased smaller than that in the another hydrogen supply operation.

Accordingly, in the hydrogen supply system 200 of this embodiment, a hydrogen supply in an amount more than necessary is suppressed, and hence, the efficiency of the hydrogen supply operation of the electrochemical hydrogen pump 100 is improved as compared to that in the past. That is, in accordance with the cumulative hydrogen supply amount in the hydrogen supply operation of the electrochemical hydrogen pump 100, the current flowing between the electrodes 15 and 16 is appropriately controlled, and hence, the increase in consumption of electric energy in the hydrogen supply operation of the electrochemical hydrogen pump 100 can be suppressed.

For example, when the hydrogen amount to be charged in the hydrogen reservoir of the hydrogen supply system 200 is small, the current adjuster 19 is controlled by the controller 50 so that the current flowing between the electrodes 15 and 16 is decreased, and when the hydrogen amount to be charged in the hydrogen reservoir of the hydrogen supply system 200 is large, the current adjuster 19 is controlled by the controller 50 so that the current described above is increased. Accordingly, for example, when hydrogen is compressed and charged in the hydrogen reservoir, the efficiency of the hydrogen supply operation of the electrochemical hydrogen pump 100 can be improved.

In addition, in the hydrogen supply system 200 of this embodiment, since the current flowing between the electrodes 15 and 16 is appropriately controlled, heat generation which is a current resistance (IR) loss of the electrolyte membrane 14 of the electrochemical hydrogen pump 100 can be suppressed. That is, when the electrolyte membrane 14 is, for example, a high molecular weight electrolyte membrane, in association with an increase in temperature of the high molecular weight electrolyte membrane caused by the heat generation thereof, drying of the high molecular weight electrolyte membrane may be advanced in some cases. As a result, although the electric resistance of the high molecular weight electrolyte membrane may be increased in some cases, in the hydrogen supply system 200 of this embodiment, by the control described above, the probability as described above can be reduced.

In addition, although the case in which hydrogen is charged in the hydrogen reservoir from the electrochemical hydrogen pump 100 is described above, even in the case in which hydrogen is directly supplied to the hydrogen demander without through the hydrogen reservoir or without provided with the hydrogen reservoir (for example, the case in which hydrogen is supplied to a high pressure tank of a fuel battery automobile), the structure and the operation of the hydrogen supply system 200 described above can also be applied.

In addition, in the case in which the hydrogen source is hydrogen generated by a water electrolysis device, when the current flowing between the electrodes 15 and 16 of the electrochemical hydrogen pump 100 is decreased smaller than that in another hydrogen supply operation, the water electrolysis device may decrease the hydrogen generation amount in accordance with the decrease described above. When the water electrolysis devise uses an electrical power of a solar power generation device, a surplus electrical power obtained when the hydrogen generation amount is decreased may be supplied to other devices. As the other devices, for example, a storage battery, an electric heater, a thermal accumulator, or a cold storage device may be mentioned.

In addition, when the current flowing between the electrodes 15 and 16 of the electrochemical hydrogen pump 100 is decreased smaller than that in another hydrogen supply operation, the hydrogen generation amount of the water electrolysis device may not be decreased. In this case, since the hydrogen generation amount of the water electrolysis devise is increased as compared to the hydrogen supply amount from the electrochemical hydrogen pump 100, a hydrogen tank, an accumulator, or the like storing hydrogen may be provided between the water electrolysis device and the electrochemical hydrogen pump 100. Accordingly, a hydrogen amount necessary for the electrochemical hydrogen pump 100 can be supplied from the hydrogen tank or the accumulator.

EXAMPLE

[Device Structure]

The structure of a hydrogen supply system 200 of an example of the first embodiment is similar to that of the hydrogen supply system 200 of the first embodiment except for the following control procedure.

That is, based on a past record of the cumulative hydrogen supply amount supplied to the hydrogen demander from the start to the completion of the hydrogen supply operation to the hydrogen demander from the electrochemical hydrogen pump 100, the controller 50 predicts a cumulative hydrogen supply amount in the hydrogen supply operation of the electrochemical hydrogen pump 100, and when the predicted cumulative hydrogen supply amount is smaller than the cumulative hydrogen supply amount in another hydrogen supply operation, the controller 50 controls the current adjuster 19 so that the current flowing between the electrodes 15 and 16 is decreased smaller than that in the another hydrogen supply operation.

Except for the features described above, the hydrogen supply system 200 of this example may be formed to have the structure similar to that of the hydrogen supply system 200 of the first embodiment.

[Operation]

Figure 2:
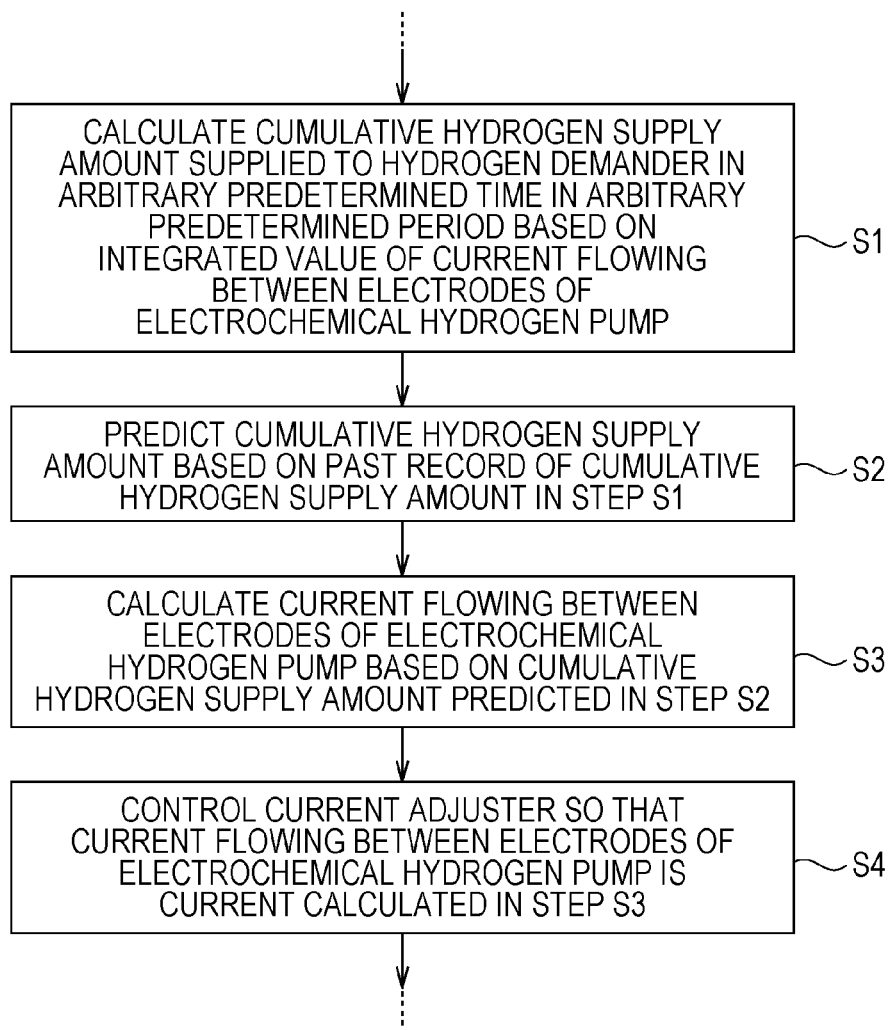
FIG. 2 is a flowchart showing one example of an operation of a hydrogen supply system of an example of the first embodiment.

FIG. 2 is a flowchart showing one example of the operation of the hydrogen supply system of the example of the first embodiment.

In addition, the following operation may be performed in such a way that the computing circuit of the controller 50 reads the control program from the storage circuit. However, it is not always essential that the following operation is performed by the controller 50. An operator may partially or fully perform the operation.

First, in Step S1, in an arbitrarily set predetermined time in an arbitrarily set predetermined period, a cumulative hydrogen supply amount to the hydrogen demander from the start to the completion of the hydrogen supply operation to the hydrogen demander from the electrochemical hydrogen pump 100 is calculated based on an integrated value of the current flowing between the electrodes 15 and 16 of the electrochemical hydrogen pump 100. The "predetermined period" and the "predetermined time" in Step S1 each may be appropriately set, for example, based on the operation characteristics and the operating conditions of the hydrogen supply system 200. For example, when the "predetermined period" in Step S1 is set to one month, and the "predetermined time" in Step S1 is set to 24 hours (one day) which is shorter than the "predetermined period", an integrated value of the hydrogen amount per one day supplied to the hydrogen demander is calculated from the number of days of the predetermined period (for example, 30 days) as the cumulative hydrogen supply amount in Step S1 and is stored in the storage circuit of the controller 50.

Next, in Step S2, based on the past record of the cumulative hydrogen supply amount in Step S1, the cumulative hydrogen supply amount in the hydrogen supply operation of the electrochemical hydrogen pump 100 is predicted.

The future cumulative hydrogen supply amount in Step S2 may be predicted by any method based on the past record of the cumulative hydrogen supply amount.

For example, from the past record of the cumulative hydrogen supply amount, the cumulative hydrogen supply amount in a future one day (such as tomorrow) may be predicted. In this case, the future cumulative hydrogen supply amount may be calculated from the average of the integrated values of the hydrogen amounts supplied to the hydrogen demander in the "predetermined period" in Step S1. For example, when the "predetermined period" in Step S1 is set to one month, and the "predetermined time" in Step S1 is set to 24 hours (one day) which is shorter than the "predetermined period", the cumulative hydrogen supply amount in the future one day may be the value obtained by dividing the total integrated value of the hydrogen amount supplied to the hydrogen demander for the number of days (such as 30 days) of the predetermined period by the above number of days.

In addition, for example, when the integrated value of the hydrogen amount supplied to the hydrogen demander in a specific day of the week is larger than that in any other days of the week, the cumulative hydrogen supply amount in the future one day may be the average value obtained from the integrated values of the hydrogen amounts supplied to the hydrogen demander in each day of the week in the "predetermined period" in Step S1.

Next, in Step S3, the current flowing between the electrodes 15 and 16 of the electrochemical hydrogen pump 100 is calculated based on the cumulative hydrogen supply amount predicted in Step S2.

In addition, in Step S4, the current adjuster 19 is controlled so that the current flowing between the electrodes 15 and 16 of the electrochemical hydrogen pump 100 is set to the current calculated in Step S3.

As described above, since the hydrogen supply system 200 of this example predicts the future cumulative hydrogen supply amount based on the past record of the cumulative hydrogen supply amount in the hydrogen supply operation of the electrochemical hydrogen pump 100, the current flowing between the electrodes 15 and 16 is appropriately controlled.

As described above, compared to the case in which the future cumulative hydrogen supply amount is not predicted, in the hydrogen supply operation of the electrochemical hydrogen pump 100, an appropriate amount of hydrogen can be supplied to the hydrogen demander from the electrochemical hydrogen pump 100.

Except for the features described above, the operation of the hydrogen supply system 200 of this example may be similar to that of the hydrogen supply system 200 of the first embodiment.

Modified Example

[Device Structure]

The structure of a hydrogen supply system 200 of a modified example of the first embodiment is similar to that of the hydrogen supply system 200 of the first embodiment except for the following control procedure.

That is, the controller 50 controls the current adjuster 19 so that a cumulative hydrogen supply amount required in an operable time of the hydrogen supply operation of the electrochemical hydrogen pump 100 is supplied to the hydrogen demander and so that a time in which the current flowing between the electrodes 15 and 16 is controlled smaller than that in another hydrogen supply operation is maximized in the above operable time.

Except for the features described above, the hydrogen supply system 200 of this modified example may be formed to have the structure similar to that of the hydrogen supply system 200 of the first embodiment or the example of the first embodiment.

[Operation]

Figure 3:
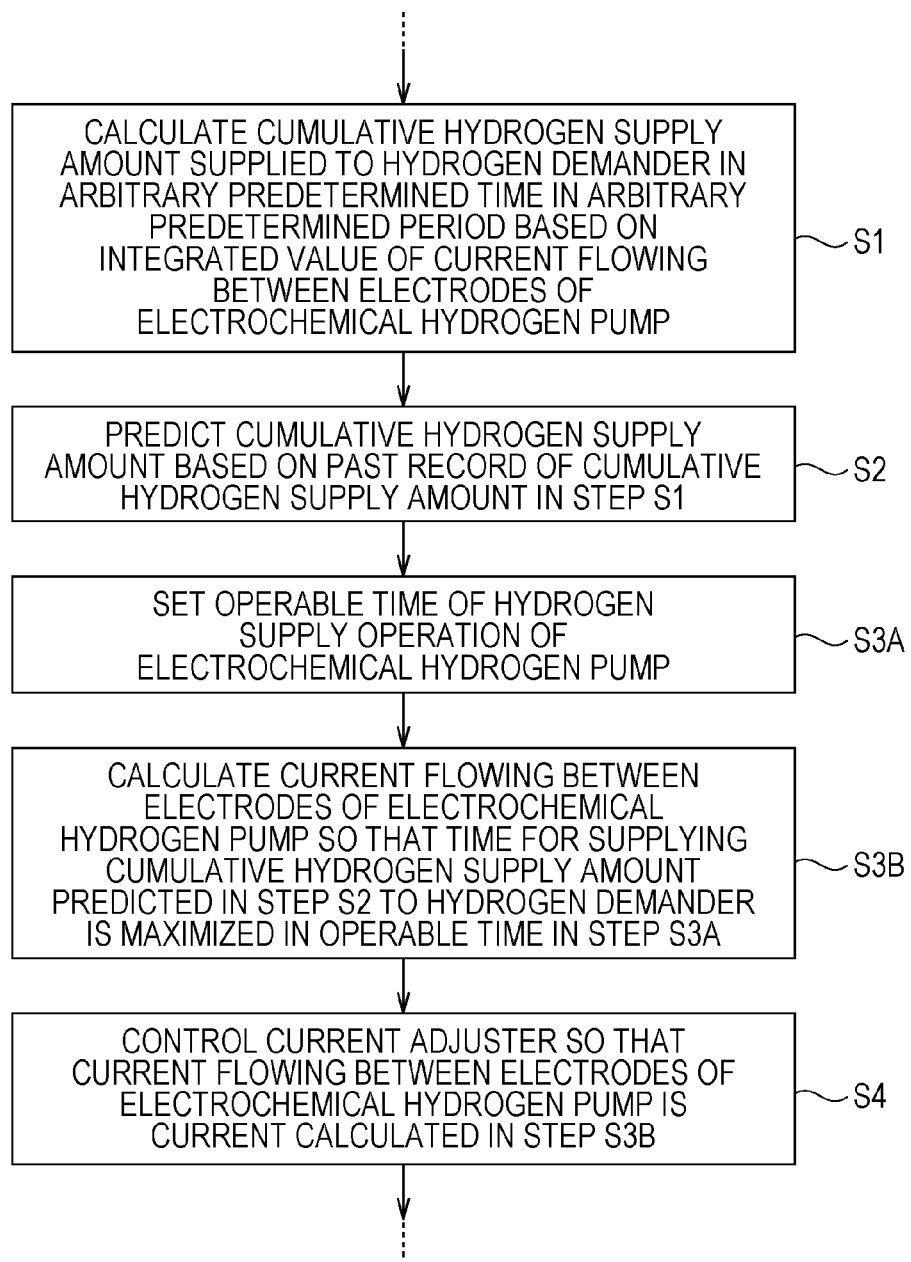
FIG. 3 is a flowchart showing one example of an operation of a hydrogen supply system of a modified example of the first embodiment.

FIG. 3 is a flowchart showing one example of the operation of the hydrogen supply system of the modified example of the first embodiment.

In addition, the following operation may be performed in such a way that the computing circuit of the controller 50 reads the control program from the storage circuit. However, it is not always essential that the following operation is performed by the controller 50. An operator may partially or fully perform the operation.

In addition, since Step S1, Step S2, and Step S4 in FIG. 3 are respectively similar to Step S1, Step S2, and Step S4 in FIG. 2, the description thereof is omitted.

In Step S3A, the operable time of the hydrogen supply operation of the electrochemical hydrogen pump 100 is set. The operable time in Step S3A may be appropriately set based on the operation characteristics and the operating conditions of the hydrogen supply system 200. This operable time may be set to an appropriate time by an operator or may be automatically set by a hydrogen supply system 200 side.

For example, when an electric power of the electrochemical hydrogen pump 100 is supplied from a commercial electric power system, although the operable time per one day of the hydrogen supply operation of the electrochemical hydrogen pump 100 is 24 hours, when the electric power of the electrochemical hydrogen pump 100 is supplied from a solar power generation system, this operable time may be set to a desired time which is changed depending on the sunshine duration.

In addition, for example, in order to allow the controller 50 of the hydrogen supply system 200 to set the operable time in Step S3A, the change of the hydrogen supply amount in the hydrogen supply operation of the electrochemical hydrogen pump 100 may be learned. For example, when a period in which the hydrogen supply amount in the hydrogen supply operation is increased is specified by learning of the change of the hydrogen supply amount, since hydrogen is required to be supplied in a shorter time in this specific period than that in the other periods, the operable time in this specific period is set to be shorter than that in the other periods.

Next, in Step S3B, the current flowing between the electrodes 15 and 16 of the electrochemical hydrogen pump 100 is calculated so that a time for supplying the cumulative hydrogen supply amount predicted in Step S2 to the hydrogen demander is maximized in the operable time in Step S3A. That is, the current flowing between the electrodes 15 and 16 of the electrochemical hydrogen pump 100 is calculated so that by maximally using the operable time in Step S3A, the above cumulative hydrogen supply amount is supplied to the hydrogen demander.

As described above, while maximally using the operable time of the hydrogen supply operation of the electrochemical hydrogen pump 100, the hydrogen supply system 200 of this modified example can supply hydrogen to the hydrogen demander from the electrochemical hydrogen pump 100.

Accordingly, compared to the case in which the operable time of the hydrogen supply operation is not maximally used unlike the above case, since the current flowing between the electrodes 15 and 16 is decreased, the increase in electric energy in the hydrogen supply operation of the electrochemical hydrogen pump 100 can be suppressed.

Except for the features described above, the operation of the hydrogen supply system 200 of this modified example may be similar to that of the hydrogen supply system 200 of the first embodiment or the example of the first embodiment.

Second Embodiment

[Device Structure]

Figure 4:
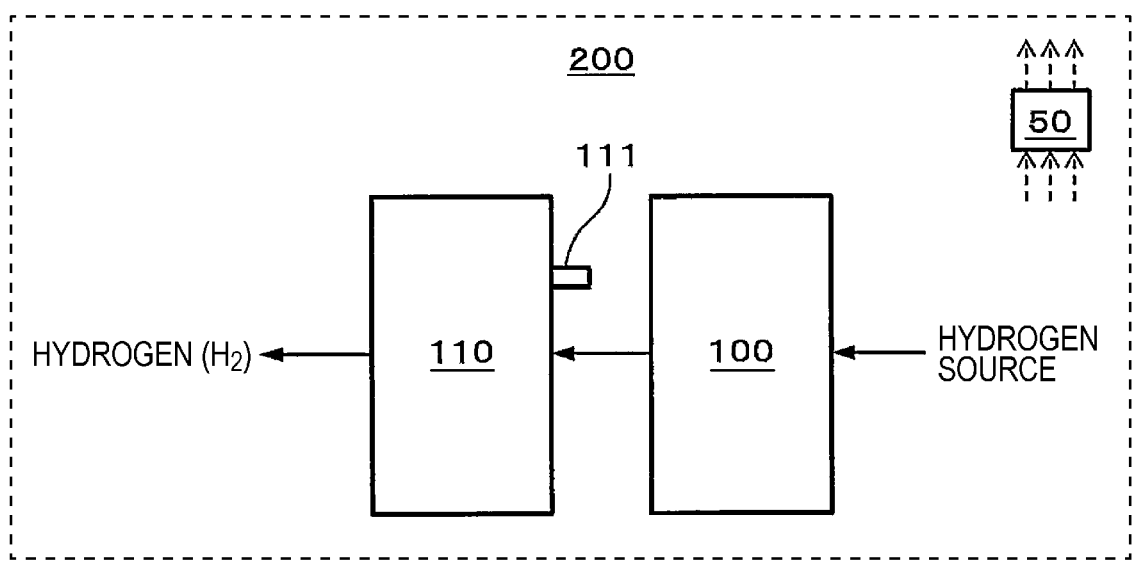
FIG. 4 is a schematic view showing one example of a hydrogen supply system of a second embodiment.

FIG. 4 is a schematic view showing one example of a hydrogen supply system of a second embodiment.

In the example shown in FIG. 4, a hydrogen supply system 200 includes an electrochemical hydrogen pump 100, a hydrogen reservoir 110, a pressure detector 111, and a controller 50. Since being similar to the electrochemical hydrogen pump 100 of the first embodiment, the electrochemical hydrogen pump 100 of this embodiment is simplified in the figure, and the description thereof is omitted.

The hydrogen reservoir 110 is a device storing hydrogen to be supplied from the electrochemical hydrogen pump 100. The hydrogen reservoir 110 may have any structure as long as capable of storing hydrogen supplied from the electrochemical hydrogen pump 100. As the hydrogen reservoir 110, for example, a hydrogen tank may be mentioned.

The pressure detector 111 is a sensor detecting the pressure in the hydrogen reservoir 110. The pressure detector 111 may have any structure as long as capable of detecting the pressure in the hydrogen reservoir 110. As the pressure detector 111, for example, a pressure meter provided for the hydrogen reservoir 110 may be mentioned.

From the pressure detected by the pressure detector 111, the controller 50 estimates a hydrogen storage amount in the hydrogen reservoir 110.

Except for the features described above, the hydrogen supply system 200 of this embodiment may have the structure similar to that of the hydrogen supply system 200 of any one of the first embodiment, the example of the first embodiment, and the modified example of the first embodiment.

[Operation]

Figure 5:
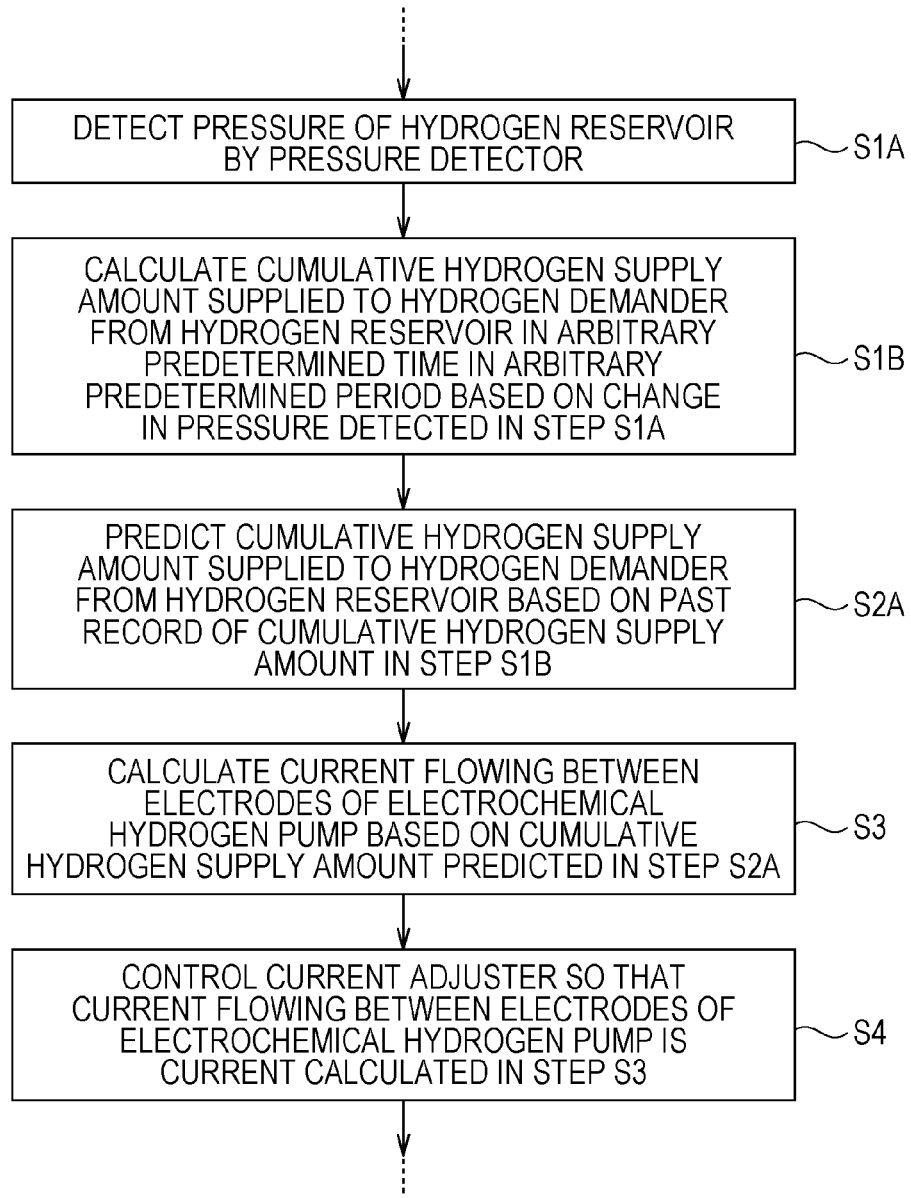
FIG. 5 is a flowchart showing one example of an operation of the hydrogen supply system of the second embodiment.

FIG. 5 is a flowchart showing one example of the operation of the hydrogen supply system of the second embodiment.

In addition, the following operation may be performed in such a way that the computing circuit of the controller 50 reads the control program from the storage circuit. However, it is not always essential that the following operation is performed by the controller 50. An operator may partially or fully perform the operation.

In addition, since Step S3 and Step S4 of FIG. 5 are respectively similar to Step S3 and Step S4 of FIG. 2, the description thereof is omitted.

In Step S1A, the pressure of the hydrogen reservoir 110 is detected by the pressure detector 111.

Next, in Step S1B, in an arbitrarily set predetermined time in an arbitrarily set predetermined period, the cumulative hydrogen supply amount supplied from the hydrogen reservoir 110 to the hydrogen demander from the start to the completion of the hydrogen supply operation to the hydrogen demander from the electrochemical hydrogen pump 100 is calculated based on the change in pressure detected in Step S1A. That is, from the pressure detected by the pressure detector 111, the hydrogen storage amount in the hydrogen reservoir 110 is estimated. In addition, as is the case in Step S1 of the example of the first embodiment, the "predetermined period" and the "predetermined time" in Step S1A may be appropriately set, for example, based on the operation characteristics and the operating conditions of the hydrogen supply system 200.

Next, based on the past record of the cumulative hydrogen supply amount in Step S1B, the cumulative hydrogen supply amount to be supplied to the hydrogen demander from the hydrogen reservoir 110 is predicted in Step S2A.

As described above, in the hydrogen supply system 200 of this embodiment, since the pressure of the hydrogen reservoir 110 is detected by the pressure detector 111, direct information (that is, the hydrogen storage amount in the hydrogen reservoir 110) corresponding to the cumulative hydrogen supply amount in the hydrogen supply operation of the electrochemical hydrogen pump 100 can be obtained. Hence, compared to the case in which the pressure of the hydrogen reservoir 110 is not detected, the current adjuster 19 of the electrochemical hydrogen pump 100 can be controlled at a high accuracy. Accordingly, in the hydrogen supply operation of the electrochemical hydrogen pump 100, an appropriate amount of hydrogen can be supplied to the hydrogen reservoir 110 from the electrochemical hydrogen pump 100.

Except for the features described above, the operation of the hydrogen supply system 200 of this embodiment may be similar to that of the hydrogen supply system 200 of any one of the first embodiment, the example of the first embodiment, and the modified example of the first embodiment.

Third Embodiment

[Device Structure]

Figure 6:
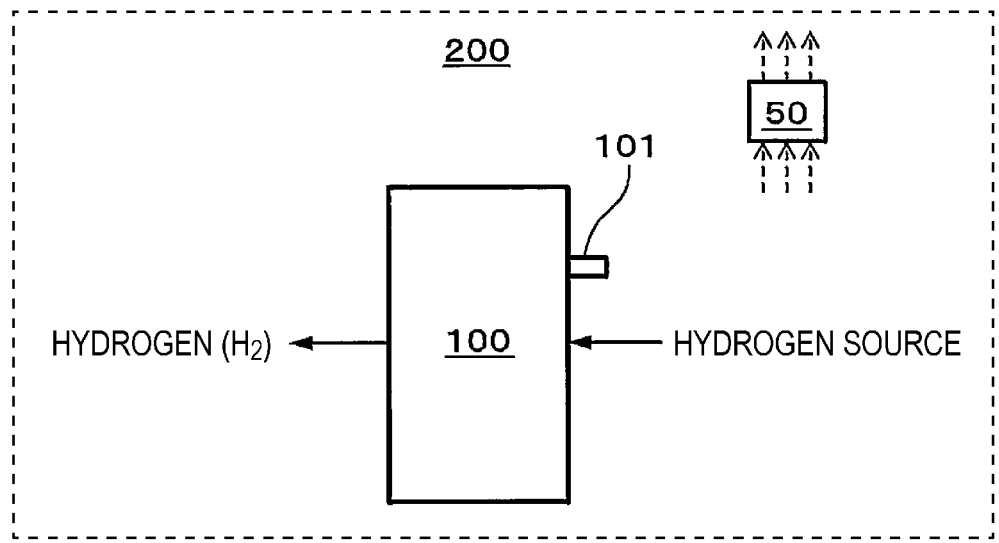
FIG. 6 is a schematic view showing one example of a hydrogen supply system of a third embodiment.

FIG. 6 is a schematic view showing one example of a hydrogen supply system of a third embodiment.

In the example shown in FIG. 6, a hydrogen supply system 200 includes an electrochemical hydrogen pump 100, a temperature detector 101, and a controller 50. Since being similar to the electrochemical hydrogen pump 100 of the first embodiment, the electrochemical hydrogen pump 100 of this embodiment is simplified in the figure, and the description thereof is omitted.

The temperature detector 101 is a sensor detecting the temperature of the electrochemical hydrogen pump 100. The temperature detector 101 may have any structure as long as capable of detecting the temperature of the electrochemical hydrogen pump 100. As the temperature detector 101, for example, a thermocouple or a thermistor provided for the electrochemical hydrogen pump 100 may be mentioned.

The controller 50 controls the current adjuster 19 of the electrochemical hydrogen pump 100 so as to adjust the current flowing between the electrodes 15 and 16 of the electrochemical hydrogen pump 100 and so that the temperature detected by the temperature detector 101 does not exceed an upper limit temperature.

Except for the features described above, the hydrogen supply system 200 of this embodiment may have the structure similar to that of the hydrogen supply system 200 of any one of the first embodiment, the example of the first embodiment, the modified example of the first embodiment, and the second embodiment. For example, in FIG. 6, although the temperature detector 101 is provided for the electrochemical hydrogen pump 100 shown in FIG. 1, the temperature detector 101 may be provided for the electrochemical hydrogen pump 100 shown in FIG. 4.

[Operation]

Figure 7:
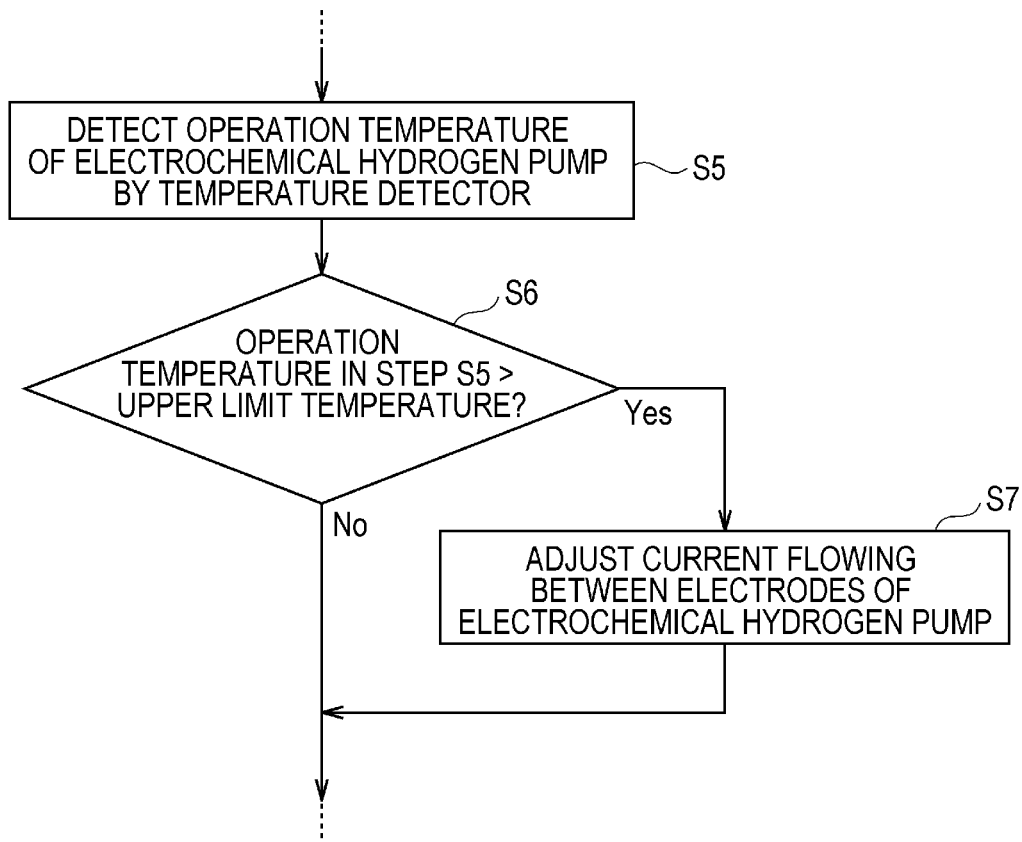
FIG. 7 is a flowchart showing one example of an operation of the hydrogen supply system of the third embodiment.

FIG. 7 is a flowchart showing one example of the operation of the hydrogen supply system of the third embodiment.

In addition, the following operation may be performed in such a way that the computing circuit of the controller 50 reads the control program from the storage circuit. However, it is not always essential that the following operation is performed by the controller 50. An operator may partially or fully perform the operation.

In Step S5, the operation temperature of the electrochemical hydrogen pump 100 is detected by the temperature detector 101.

Next, in Step S6, whether the operation temperature detected in Step S5 is more than the upper limit temperature or not is judged. In addition, the "upper limit temperature" in Step S6 may be appropriately set, for example, based on the operation characteristics and the operating conditions of the electrochemical hydrogen pump 100. For example, when the electrolyte membrane 14 of the electrochemical hydrogen pump 100 is a high molecular weight electrolyte membrane, as the temperature of the electrochemical hydrogen pump 100 is increased, the high molecular weight electrolyte membrane may be dried in some cases. Accordingly, in this case, as the "upper limit temperature" in Step S6, an upper limit value in a temperature range in which drying of the high molecular weight electrolyte membrane of the electrochemical hydrogen pump 100 is not advanced may be set. The "upper limit temperature" may be used as an index at which the high molecular weight electrolyte membrane is dried and at which the decomposition thereof is advanced. For example, in the case of a fluorine-containing high molecular weight electrolyte membrane, the upper limit temperature is set to up to 80° C. and may be set in consideration of a humidified state of a gas to be introduced into the electrode 16 side. In this embodiment, the upper limit temperature is set to 70° C.

In Step S6, when the operation temperature detected in Step S5 is the upper limit temperature or less, the operation of the hydrogen supply system 200 is maintained as it is. In addition, at an appropriate time, the operation from Step S5 is again carried out.

In Step S6, when the operation temperature detected in Step S5 is more than the upper limit temperature, in Step S7, the current flowing between the electrodes 15 and 16 of the electrochemical hydrogen pump 100 is adjusted. In particular, the current adjuster 19 of the electrochemical hydrogen pump 100 is controlled so that the current flowing between the electrodes 15 and 16 is decreased. In addition, at an appropriate time, the operation from Step S5 is again carried out.

As described above, in the hydrogen supply system 200 of this embodiment, the operation temperature of the electrochemical hydrogen pump 100 can be controlled at an appropriate temperature which is equivalent to or less than the upper limit temperature.

For example, when the electrolyte membrane of the electrochemical hydrogen pump 100 is a high molecular weight electrolyte membrane, as the temperature of the electrochemical hydrogen pump 100 is increased, the high molecular weight electrolyte membrane may be dried in some cases. Accordingly, by the increase in electric resistance of the high molecular weight electrolyte membrane, it may be difficult in some cases to stably operate the hydrogen supply system 200 at a high efficiency.

Accordingly, in the hydrogen supply system 200 of this embodiment, by adjusting the current flowing between the electrodes 15 and 16, the operation temperature of the electrochemical hydrogen pump 100 is set to the upper limit temperature or less, so that the probability as described above can be reduced. That is, when the current flowing between the electrodes 15 and 16 of the electrochemical hydrogen pump 100 is decreased, the current density of the high molecular weight electrolyte membrane is decreased, and as a result, heat generation of the high molecular weight electrolyte membrane is suppressed. Accordingly, since the increase in electric resistance caused by the drying of the high molecular weight electrolyte membrane can be suppressed, the hydrogen supply system 200 is likely to be stably operated at a high efficiency.

Except for the features described above, the operation of the hydrogen supply system 200 of this embodiment may be similar to that of the hydrogen supply system 200 of any one of the first embodiment, the example of the first embodiment, the modified example of the first embodiment, and the second embodiment.

Fourth Embodiment

[Device Structure]

Figure 8:
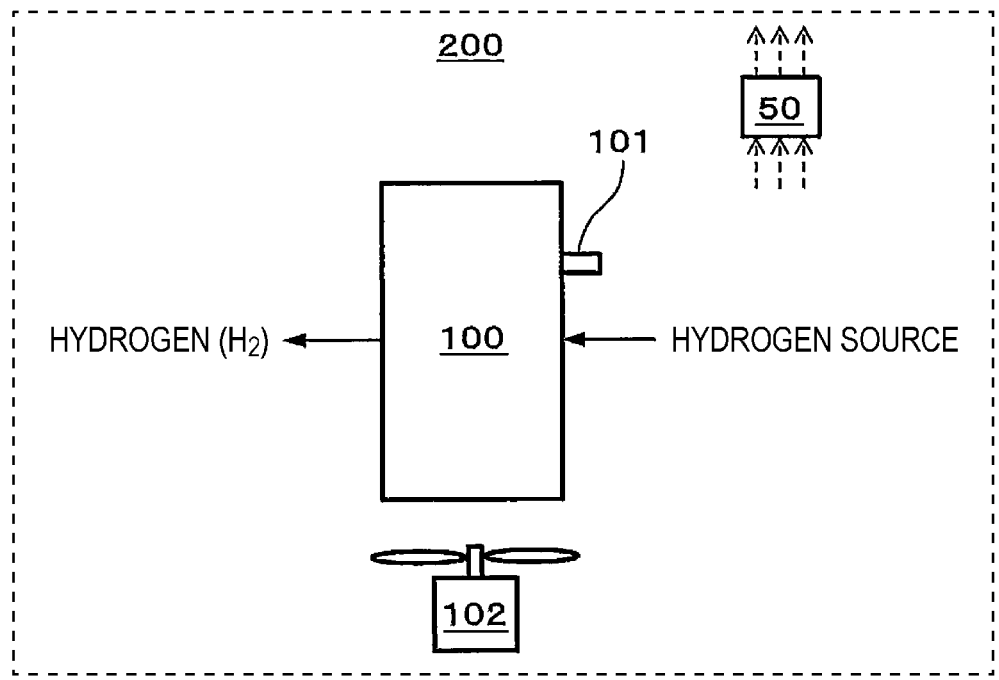
FIG. 8 is a schematic view showing one example of a hydrogen supply system of a fourth embodiment.

FIG. 8 is a schematic view showing one example of a hydrogen supply system of a fourth embodiment.

In the example shown in FIG. 8, a hydrogen supply system 200 includes an electrochemical hydrogen pump 100, a temperature detector 101, a cooling device 102, and a controller 50. Since being similar to the electrochemical hydrogen pump 100 of the first embodiment, the electrochemical hydrogen pump 100 of this embodiment is simplified in the figure, and the description thereof is omitted. Since the temperature detector 101 of this embodiment is similar to that of the third embodiment, the description thereof is omitted.

The cooling device 102 is a device cooling the electrochemical hydrogen pump 100. The cooling device 102 may have any structure as long as capable of cooling the electrochemical hydrogen pump 100. As the cooling device 102, for example, a cooling fan may be mentioned.

The controller 50 operates the cooling device 102 so that the temperature detected by the temperature detector 101 does not exceed an upper limit temperature.

Except for the features described above, the hydrogen supply system 200 of this embodiment may have the structure similar to that of any one of the first embodiment, the example of the first embodiment, the modified example of the first embodiment, the second embodiment, and the third embodiment. For example, in FIG. 8, although the cooling device 102 is provided to cool the electrochemical hydrogen pump 100 shown in FIG. 6, the cooling device may be provided to cool the electrochemical hydrogen pump 100 shown in FIG. 4.

[Operation]

Figure 9:
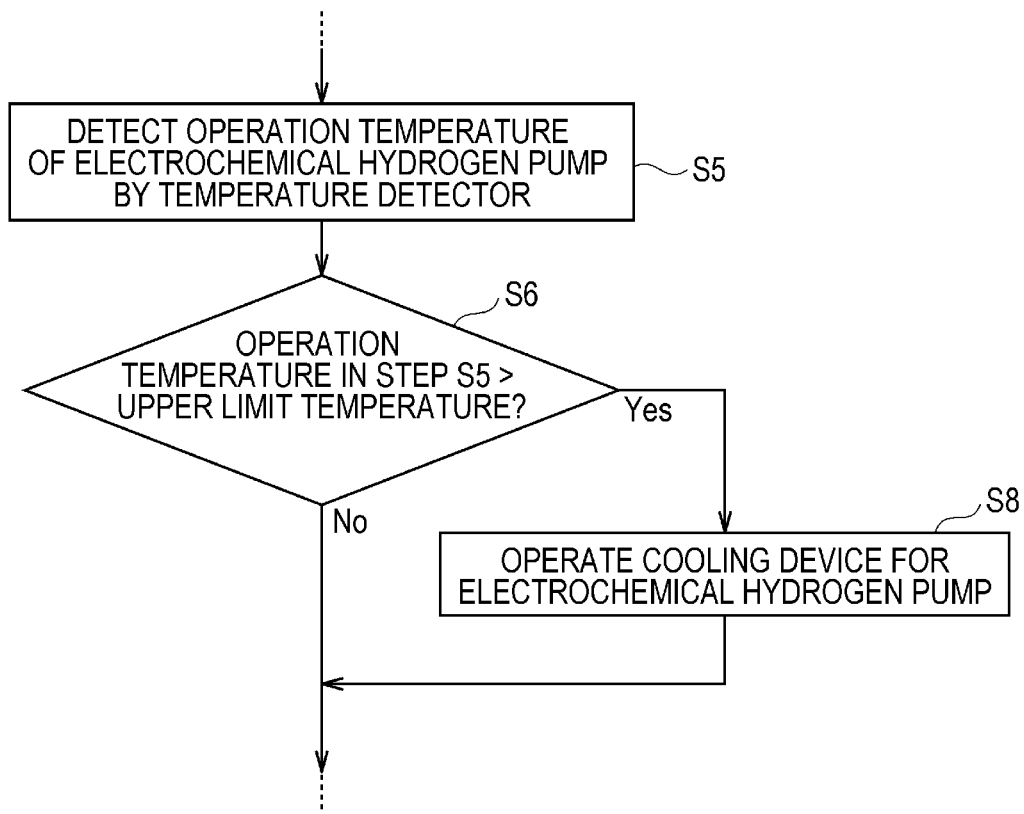
FIG. 9 is a flowchart showing one example of an operation of the hydrogen supply system of the fourth embodiment.

FIG. 9 is a flowchart showing one example of the operation of the hydrogen supply system of the fourth embodiment.

In addition, the following operation may be performed in such a way that the computing circuit of the controller 50 reads the control program from the storage circuit. However, it is not always essential that the following operation is performed by the controller 50. An operator may partially or fully perform the operation.

In addition, since Step S5 and S6 shown in FIG. 9 are respectively similar to Step S5 and S6 shown in FIG. 7, the description thereof is omitted.

In Step S6, when the operation temperature detected in Step S5 is more than the upper limit temperature, in Step S8, the cooling device 102 for the electrochemical hydrogen pump 100 is operated. For example, when the cooling device 102 is a cooling fan, cooling air is supplied by the cooling fan. In addition, at an appropriate time, the operation from Step S5 is again carried out.

In addition, in FIG. 9, although not shown in the figure, the adjustment of the current flowing between the electrodes 15 and 16 shown in Step S7 of FIG. 7 may be performed together with an operation of the cooling device 102 shown in Step S8. That is, in this case, the adjustment of the current flowing between the electrodes 15 and 16 and the operation of the cooling device 102 are simultaneously performed. For example, when the hydrogen supply system 200 supplies a large amount of hydrogen to the hydrogen demander in a short time, in order to sufficiently obtain the operation ability of the electrochemical hydrogen pump 100, the current flowing between the electrodes 15 and 16 is required to be increased. In addition, in this case, by operating the cooling device 102, the operation temperature of the electrochemical hydrogen pump 100 is required to be controlled at an appropriate temperature which is equivalent to or less than the upper limit temperature.

As described above, the hydrogen supply system 200 of this embodiment can control the operation temperature of the electrochemical hydrogen pump 100 at an appropriate temperature which is equivalent to or less than the upper limit temperature.

For example, when the electrolyte membrane of the electrochemical hydrogen pump 100 is a high molecular weight electrolyte membrane, as the temperature of the electrochemical hydrogen pump 100 is increased, the high molecular weight electrolyte membrane may be dried in some cases. Accordingly, by the increase in electric resistance of the high molecular weight electrolyte membrane, it may be difficult in some cases to stably operate the hydrogen supply system 200 at a high efficiency.

Accordingly, in the hydrogen supply system 200 of this embodiment, by the operation of the cooling device 102 for the electrochemical hydrogen pump 100, the operation temperature of the electrochemical hydrogen pump 100 is set to the upper limit temperature or less, so that the probability as described above can be reduced. Accordingly, since the increase in electric resistance caused by the drying of the high molecular weight electrolyte membrane can be suppressed, the hydrogen supply system 200 is likely to be stably operated at a high efficiency.

Except for the features described above, the operation of the hydrogen supply system 200 of this embodiment may be similar to that of the hydrogen supply system 200 of any one of the first embodiment, the example of the first embodiment, the modified example of the first embodiment, the second embodiment, and the third embodiment.

Fifth Embodiment

[Device Structure]

The structure of a hydrogen supply system 200 of a fifth embodiment may be similar to that of the hydrogen supply system 200 of the fourth embodiment except for the following control procedure.

That is, the controller 50 controls the operation of the cooling device 102 and the operation of the electrochemical hydrogen pump 100 so that the temperature detected by the temperature detector 101 is set to an upper limit temperature or less, and the total of electric energy required for the operation of the cooling device 102 for the electrochemical hydrogen pump 100 and electric energy required for the operation of the electrochemical hydrogen pump 100 is minimized.

Except for the features described above, the hydrogen supply system 200 of this embodiment may have the structure similar to that of the hydrogen supply system 200 of any one of the first embodiment, the example of the first embodiment, the modified example of the first embodiment, the second embodiment, the third embodiment, and the fourth embodiment.

[Operation]

Figure 10:
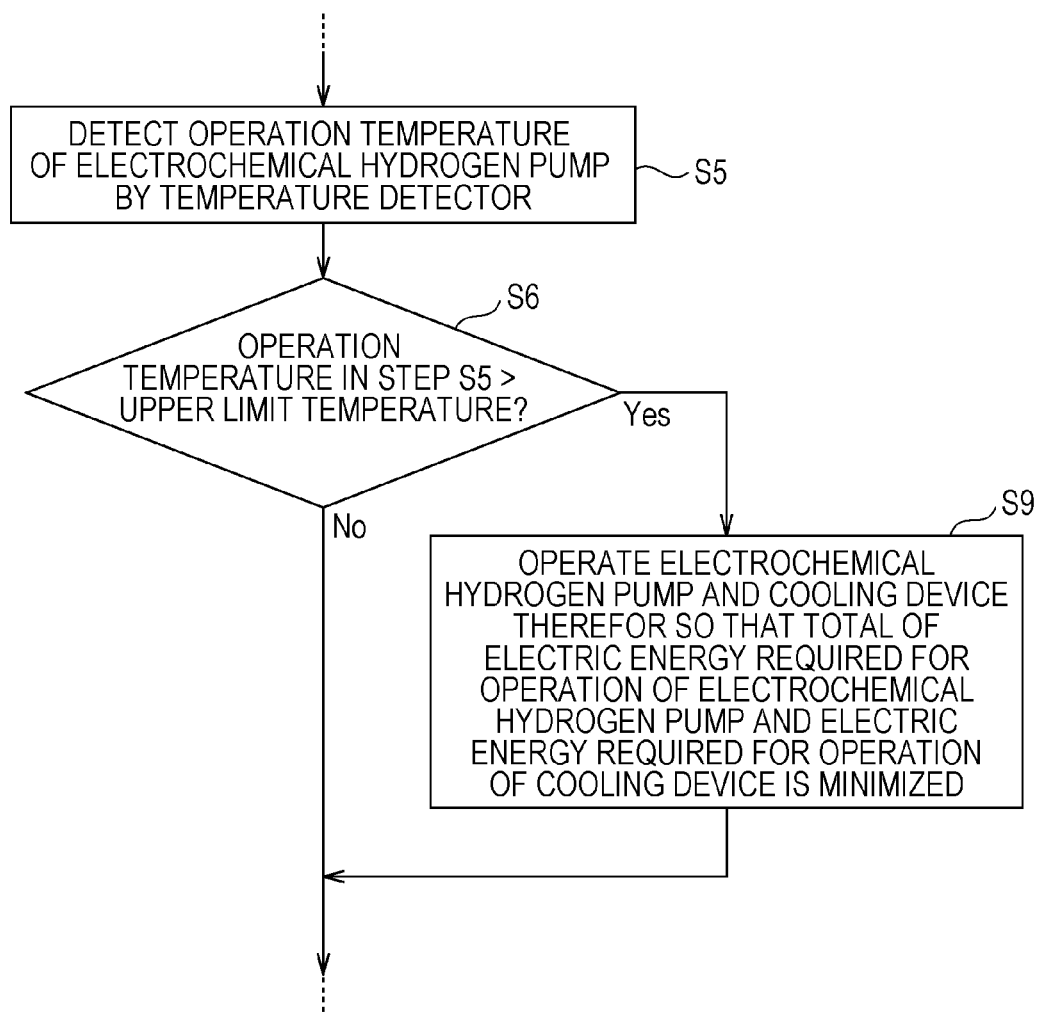
FIG. 10 is a flowchart showing one example of an operation of a hydrogen supply system of a fifth embodiment.

FIG. 10 is a flowchart showing one example of the operation of the hydrogen supply system of the fifth embodiment.

In addition, the following operation may be performed in such a way that the computing circuit of the controller 50 reads the control program from the storage circuit. However, it is not always essential that the following operation is performed by the controller 50. An operator may partially or fully perform the operation.

In addition, since Step S5 and S6 shown in FIG. 10 are respectively similar to Step S5 and S6 shown in FIG. 7, the description thereof is omitted.

In Step S6, when the operation temperature detected in Step S5 is more than the upper limit temperature, in Step S9, the operation of the cooling device 102 and the operation of the electrochemical hydrogen pump 100 are controlled so that the total of electric energy required for the operation of the cooling device 102 for the electrochemical hydrogen pump 100 and electric energy required for the operation of the electrochemical hydrogen pump 100 is minimized. In addition, at an appropriate time, the operation from Step S5 is again carried out.

As described above, since the hydrogen supply system 200 of this embodiment controls the operation of the cooling device 102 and the operation of the electrochemical hydrogen pump 100 while controlling the operation temperature of the electrochemical hydrogen pump 100 at an appropriate temperature which is equivalent to or less than the upper limit temperature, the operation efficiency can be optimized so that the total electric energy required for the two operations described above is minimized.

Except for the features described above, the operation of the hydrogen supply system 200 of this embodiment may be similar to that of the hydrogen supply system 200 of any one of the first embodiment, the example of the first embodiment, the modified example of the first embodiment, the second embodiment, the third embodiment, and the fourth embodiment.

Sixth Embodiment

A hydrogen supply system 200 of a sixth embodiment is similar to the hydrogen supply system 200 of any one of the first embodiment, the example of the first embodiment, the modified example of the first embodiment, the second embodiment, the third embodiment, the fourth embodiment, and the fifth embodiment except for that the controller 50 includes the following display device 60.

Figure 11:
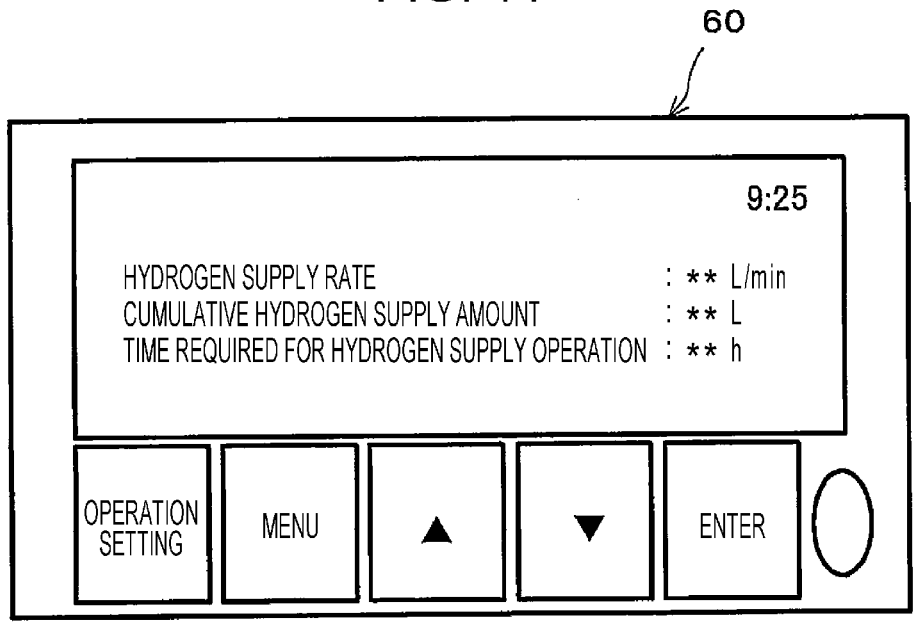
FIG. 11 is a schematic view showing one example of a display device provided for a controller in a hydrogen supply system of a sixth embodiment.

FIG. 11 is a schematic view showing one example of a display device provided for the controller of the hydrogen supply system of the sixth embodiment. FIG. 11 shows a display screen of a display device 60 in the case in which the current flowing between the electrodes 15 and 16 of the electrochemical hydrogen pump 100 is controlled smaller than that in another hydrogen supply operation by the current adjuster 19.

The display device 60 is a device displaying a supply rate of hydrogen to be supplied from the hydrogen supply system 200, a cumulative hydrogen supply amount supplied to the hydrogen demander from the start to the completion of the hydrogen supply operation to the hydrogen demander from the electrochemical hydrogen pump 100, and a time required for the hydrogen supply operation of the electrochemical hydrogen pump 100.

In addition, as the display device 60, for example, a liquid crystal display including a touch operation function may be mentioned. Accordingly, the operation state of the hydrogen supply system 200 is not only displayed on the display screen of the display device 60, but also an operator can input an appropriate control instruction to the controller 50.

As described above, according to the hydrogen supply system 200 of this embodiment, the operator can easily visually recognize on the display screen of the display device 60, various information, such as the hydrogen supply rate, the cumulative hydrogen supply amount, and the time required for the hydrogen supply operation.

Seventh Embodiment

A hydrogen supply system 200 of this embodiment is similar to the hydrogen supply system 200 of any one of the first embodiment, the example of the first embodiment, the modified example of the first embodiment, the second embodiment, the third embodiment, the fourth embodiment, the fifth embodiment, and the sixth embodiment except for that the following acquisition device is provided.

The acquisition device is a device acquiring an instruction of canceling the control (hereinafter, referred to as "highly efficient operation of the hydrogen supply system 200") by the controller 50 in which the current flowing between the electrodes 15 and 16 of the electrochemical hydrogen pump 100 is decreased smaller than that in another hydrogen supply operation by controlling the current adjuster 19 in the hydrogen supply operation of the electrochemical hydrogen pump 100.

Figure 12:
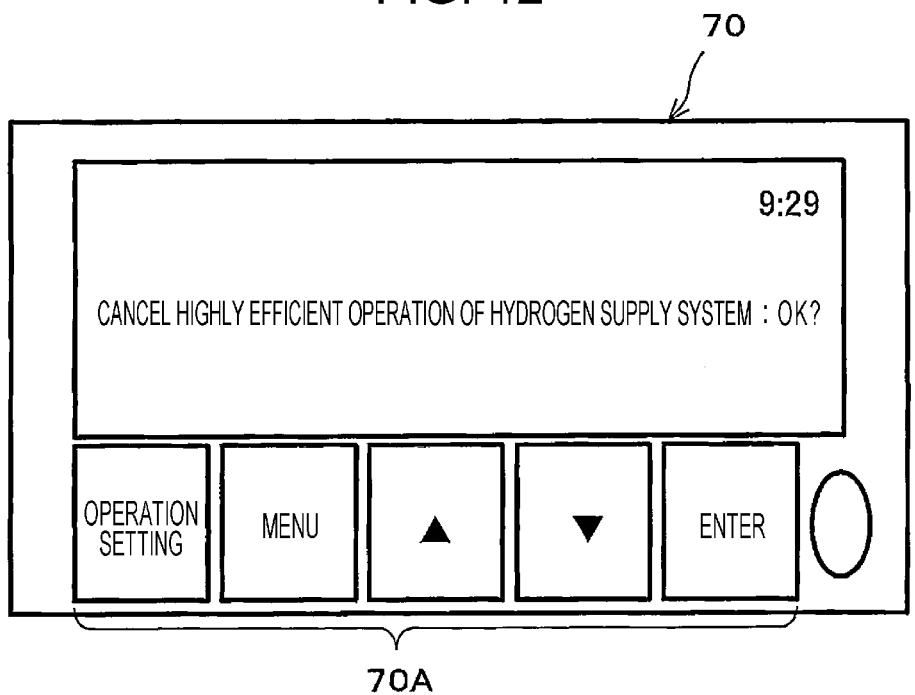
FIG. 12 is a schematic view showing one example of an acquisition device of a hydrogen supply system of a seventh embodiment.

FIG. 12 is a schematic view showing one example of the acquisition device of the hydrogen supply system of the seventh embodiment. In FIG. 12, the acquisition device acquiring the instruction of canceling the highly efficient operation of the hydrogen supply system 200 is formed of a touch key 70A displayed on a screen of a display device 70 provided for the controller 50 but is not limited thereto.

For example, as the acquisition device, for example, there may be used a mechanical switch or a push button, each of which is not shown, provided for the hydrogen supply system 200.

In addition, as the acquisition device, a communication device not shown may also be used. Accordingly, an operator of the hydrogen supply system 200 can send the instruction of canceling the highly efficient operation of the hydrogen supply system 200 from an information mobile terminal (such as a smart phone) to the communication device by wireless communication.

As described above, since including the above acquisition device, the hydrogen supply system 200 of this embodiment can appropriately cancel the highly efficient operation of the hydrogen supply system 200.

In addition, the first embodiment, the example of the first embodiment, the modified example of the first embodiment, the second embodiment, the third embodiment, the fourth embodiment, the fifth embodiment, the sixth embodiment, and the seventh embodiment may be used in combination as long as not conflicting with each other.

In addition, from the above description, many improvements and other embodiments of the present disclosure are apparent to a person skilled in the art. Hence, it is to be understood that the above description is described by way of example and is provided so as to suggest the best mode of carrying out the present disclosure to a person skilled in the art. The details of the structure and/or the function of the present disclosure may be substantially modified and/or changed without departing from the spirit of the present disclosure.

One aspect of the present disclosure is to provide a hydrogen supply system in which since a hydrogen supply in an amount more than necessary is suppressed, the efficiency of a hydrogen supply operation of an electrochemical hydrogen pump is improved as compared to that in the past.

What is claimed is:

1. A hydrogen supply system, comprising:
   a controller; and
   an electrochemical hydrogen pump, including
      an electrolyte membrane;
      a pair of electrodes provided on two surfaces of the electrolyte membrane; and
      a current adjuster adjusting a current flowing between the electrodes,
   wherein the controller is programmed to control the electrochemical hydrogen pump to perform a hydrogen supply operation supplying pressure-boosted hydrogen to a hydrogen demander by allowing a current to flow between the electrodes by the current adjuster; and
   wherein the controller is programmed to control the current adjuster so that the current flowing between the electrodes is decreased to be smaller than that in another hydrogen supply operation when a cumulative hydrogen supply amount that is supplied to the hydrogen demander from start to completion of the hydrogen supply operation to the hydrogen demander from the electrochemical hydrogen pump is smaller than a cumulative hydrogen supply amount in the another hydrogen supply operation.

2. The hydrogen supply system according to claim 1, wherein the controller is further programmed to predict the cumulative hydrogen supply amount in the hydrogen supply operation based on a past record of the cumulative hydrogen supply amount, and when the predicted cumulative hydrogen supply amount is smaller than the cumulative hydrogen supply amount in the another hydrogen supply operation, the controller is further programmed to control the current adjuster so that the current flowing between the electrodes is decreased smaller than that in the another hydrogen supply operation.

3. The hydrogen supply system according to claim 1, wherein the controller is further programmed to control the current adjuster so that the cumulative hydrogen supply amount required in an operable time of the hydrogen supply operation of the electrochemical hydrogen pump is supplied to the hydrogen demander and so that a time in which the current flowing between the electrodes is controlled smaller than that in the another hydrogen supply operation is maximized in the operable time.

4. The hydrogen supply system according to claim 1, further comprising:
   a hydrogen reservoir storing hydrogen to be supplied from the electrochemical hydrogen pump; and
   a pressure detector detecting the pressure in the hydrogen reservoir,
   wherein the controller is further programmed to estimate a hydrogen storage amount in the hydrogen reservoir from the pressure detected by the pressure detector.

5. The hydrogen supply system according to claim 1, further comprising:
   a temperature detector detecting the temperature of the electrochemical hydrogen pump,
   wherein the controller is further programmed to control the current flowing between the electrodes by adjusting the current adjuster so that the temperature detected by the temperature detector does not exceed an upper limit temperature.

6. The hydrogen supply system according to claim 1, further comprising:
   a temperature detector detecting the temperature of the electrochemical hydrogen pump; and
   a cooling device for the electrochemical hydrogen pump,
   wherein the controller is further programmed to operate the cooling device so that the temperature detected by the temperature detector does not exceed an upper limit temperature.

7. The hydrogen supply system according to claim 1, further comprising:
   a temperature detector detecting the temperature of the electrochemical hydrogen pump; and
   a cooling device for the electrochemical hydrogen pump,
   wherein the controller is further programmed to control an operation of the cooling device and the operation of the electrochemical hydrogen pump so that the temperature detected by the temperature detector does not exceed an upper limit temperature and so as to minimize the total of electric energy required for the operation of the cooling device and electric energy required for the operation of the electrochemical hydrogen pump.

8. The hydrogen supply system according to claim 1, further comprising:
a display device,
wherein the controller is further programmed to control the display device to display a supply rate of hydrogen to be supplied from the hydrogen supply system, the cumulative hydrogen supply amount, and a time required for the hydrogen supply operation.

9. The hydrogen supply system according to claim 1, further comprising:
an acquisition device,
wherein the controller is further programmed to control the acquisition device to acquire an instruction of canceling the control by the controller in which the current flowing between the electrodes is decreased smaller than that in the another hydrogen supply operation by controlling the current adjuster in the hydrogen supply operation.

10. A method of operating a hydrogen supply system, which includes a controller and an electrochemical hydrogen pump, the electrochemical hydrogen pump including an electrolyte membrane, a pair of electrodes provided on two surfaces of the electrolyte membrane, and a current adjuster, the method comprising: adjusting, by the current adjuster, a current flowing between the electrodes; performing, by the electrochemical hydrogen pump, a hydrogen supply operation supplying pressure-boosted hydrogen to a hydrogen demander by allowing a current to flow between the electrodes by the current adjuster; and controlling, by the controller, the current adjuster so that the current flowing between the electrodes is decreased to be smaller than that in another hydrogen supply operation when a cumulative hydrogen supply amount that is supplied to the hydrogen demander from start to completion of the hydrogen supply operation to the hydrogen demander from the electrochemical hydrogen pump is smaller than a cumulative hydrogen supply amount in the another hydrogen supply operation.

11. The method of operating the hydrogen supply system according to claim 10,
wherein the controller predicts the cumulative hydrogen supply amount in the hydrogen supply operation based on a past record of the cumulative hydrogen supply amount, and when the predicted cumulative hydrogen supply amount is smaller than the cumulative hydrogen supply amount in the another hydrogen supply operation, the controller controls the current adjuster so that the current flowing between the electrodes is decreased smaller than that in the another hydrogen supply operation.

12. The method of operating the hydrogen supply system according to claim 10,
wherein the controller controls the current adjuster so that the cumulative hydrogen supply amount required in an operable time of the hydrogen supply operation of the electrochemical hydrogen pump is supplied to the hydrogen demander and so that a time in which the current flowing between the electrodes is controlled smaller than that in the another hydrogen supply operation is maximized in the operable time.

13. The method of operating the hydrogen supply system according to claim 10, further comprising:
storing, by a hydrogen reservoir, hydrogen to be supplied from the electrochemical hydrogen pump; and
detecting, by a pressure detector, the pressure in the hydrogen reservoir,
wherein the controller estimates a hydrogen storage amount in the hydrogen reservoir from the pressure detected by the pressure detector.

14. The method of operating the hydrogen supply system according to claim 10, further comprising:
detecting, by a temperature detector, the temperature of the electrochemical hydrogen pump,
wherein the controller controls the current flowing between the electrodes by adjusting the current adjuster so that the temperature detected by the temperature detector does not exceed an upper limit temperature.

15. The method of operating the hydrogen supply system according to claim 10, further comprising:
detecting, by a temperature detector, the temperature of the electrochemical hydrogen pump; and
cooling, by a cooling device, the electrochemical hydrogen pump,
wherein the controller operates the cooling device so that the temperature detected by the temperature detector does not exceed an upper limit temperature.

16. The method of operating the hydrogen supply system according to claim 10, further comprising:
detecting, by a temperature detector, the temperature of the electrochemical hydrogen pump; and
cooling, by a cooling device, the electrochemical hydrogen pump,
wherein the controller controls an operation of the cooling device and the operation of the electrochemical hydrogen pump so that the temperature detected by the temperature detector does not exceed an upper limit temperature and so as to minimize the total of electric energy required for the operation of the cooling device and electric energy required for the operation of the electrochemical hydrogen pump.

17. The method of operating the hydrogen supply system according to claim 10, further comprising:
displaying, a display device, a supply rate of hydrogen to be supplied from the hydrogen supply system, the cumulative hydrogen supply amount, and a time required for the hydrogen supply operation.

18. The method of operating the hydrogen supply system according to claim 10, further comprising:
acquiring, by an acquisition device, an instruction of canceling the control by the controller in which the current flowing between the electrodes is decreased smaller than that in the another hydrogen supply operation by controlling the current adjuster in the hydrogen supply operation.

* * * * *